June 30, 1959 W. S. TANDLER ET AL 2,892,257
TOLERANCE INDICATING GAUGING APPARATUS
Filed April 17, 1956 7 Sheets-Sheet 4

INVENTORS
William S Tandler
Morris Grossman
BY
Campbell, Brumbaugh
Free and Graves

United States Patent Office

2,892,257
Patented June 30, 1959

2,892,257

TOLERANCE INDICATING GAUGING APPARATUS

William S. Tandler, New York, and Morris Grossman, Brooklyn, N.Y., assignors, by mesne assignments, to The Warner & Swasey Company, Cleveland, Ohio, a corporation of Ohio Application April 17, 1956, Serial No. 578,841

23 Claims. (Cl. 33—174)

This invention relates generally to apparatus for gauging a dimensional condition of a mechanical part. More particularly, this invention relates to apparatus of the above-noted character which may be adapted by a single gauging operation to determine at least two dimensional conditions of differing nature characterizing the part, and which may be further adapted to selectively undergo a recording operation when the forerunning gauging operation indicates that the part in at least one of its dimensional conditions does not satisfy a preselected tolerance requirement therefor.

In recent years the trend in manufacturing has been towards automation of factory operations which previously had been controlled by a human operator. One of the salient teachings of automation is that of controlling such factory operations by means of a "feedback" principle wherein the deviation of a cutting tool from a programmed position develops an error signal which causes the cutting tool to be corrected in position so as to eliminate the deviation.

Such use of a "feedback" principle may well, however, create more disadvantages than it cures. For example, where the cutting tool must perform a number of operations in a small working space, it is extremely difficult, if not impossible, to fit into this working space the number of feelers or like sensitive elements necessary to control all of the operations. Also, when the "feedback" principle is used to perform a number of operations on a part, if the principle fails as to even one operation so as to render the part defective in respect to the work done thereby, the net result, because of this one defective operation, is a total loss of the investment of time and money spent on all the operations for this part. Also, the use of a "feedback" principle requires a complex feedback control system with an accompanying likelihood of frequent breakdowns in the system, and with an accompanying difficulty of obtaining the properly skilled personnel required to service such complex system.

As a further consideration, each of a number of operations performed on a part by use of the "feedback" principle may be satisfactory in terms of the tolerances established for that individual operation, and, yet, the several operations may have been done in such manner that one or more correlation tolerances relating operations may not have been satisfied. There is no way in using the "feedback" principle for several operations to satisfy both individual tolerances and correlation tolerances except by building into the feedback control system a correlating circuit or the like for each correlation tolerance which must be taken into account. If, however, any substantial number of such correlation tolerances are involved, any feedback control system incorporating the devices required to control operations in accordance with these correlation tolerances would be so intricate, expensive, and susceptible to breakdown that the system would be highly impractical. The "feedback" principle is thus not an apt principle for automating the manufacture of a complex part, such as a gear, wherein individual tolerance measurements of, say, separate teeth are largely meaningless inasmuch as the overall tolerance acceptibility of such part does not depend so much on the dimensional characteristics in isolation of particular portions thereof as on the relation of these dimensional characteristics to the whole rest of the part.

It will thus be seen that the "feedback" principle is often not adaptable to the purpose of converting a manufacturing procedure into manufacturing by automation. Rather, when the procedure to be automated requires tolerance control over a plurality of forming operation for a single part, it has been discovered in connection with this invention that such tolerance control is best obtained by the method wherein mechanical parts after being formed are gauged for the several tolerance values of significance to the part, and wherein the gauging operation is followed by a recording of appropriate dimensional conditions of a part when and only when the gauging operation has indicated that at least one such dimensional condition of the part violates a preselected and exacting tolerance requirement therefor.

It is accordingly an object of the invention to provide apparatus to gauge one or more dimensional conditions of a part, and to follow up this gauging by recording of one or more dimensional conditions of the part when and only when the gauging operation indicates that the part does not meet a preselected tolerance requirement for at least one of the said dimensional conditions.

It is another object of the invention to provide apparatus adapted to determine a plurality of tolerances of differing nature by a single gauging operation.

These and other objects are realized according to the present invention by providing apparatus which includes means for mounting a mechanical part to be gauged, at least one probe means adapted, in a first gauging movement, to move between engaged and disengaged positions with the part, a system which controls the movement of the probe means, and an indicating means which responds to a change in the relation of probe means and part between engagement and disengagement to provide a signal indicative of whether or not the portion of the part in contact with the probe means conforms to a preselected tolerance for a dimensional condition associated with this portion. This signal is applied to the movement control system to cause the probe means to undergo a selective second gauging movement in respect to the part only in that instance when the first gauging movement has indicated that the part violates the preselected tolerance. During this second gauging movement a recording means makes a record of at least the dimensional condition indicated to be in violation of its tolerance.

As a feature according to the invention, the apparatus may include a plurality of probe means, and an indicating means which is conjointly responsive to the change in the respective relations of the plurality of probe means between engagement with and disengagement with the part to provide an indication as to whether or not the part satisfies a preselected correlation tolerance requirement for a dimensional condition which is gauged by the conjoint action of the plurality of probe means. This last-named feature is considered to be an inventive feature whether or not the apparatus is also characterized by the first-named feature of a selective recording operation following an initial gauging operation.

For a better understanding of the invention, reference is made to the following description of a representative embodiment thereof taken in conjunction with the accompanying drawings wherein:

Figures 1a and 1b, when considered in side-by-side relation, illustrate a plan view of a schematic layout of an apparatus according to the present invention;

Figure 1A:
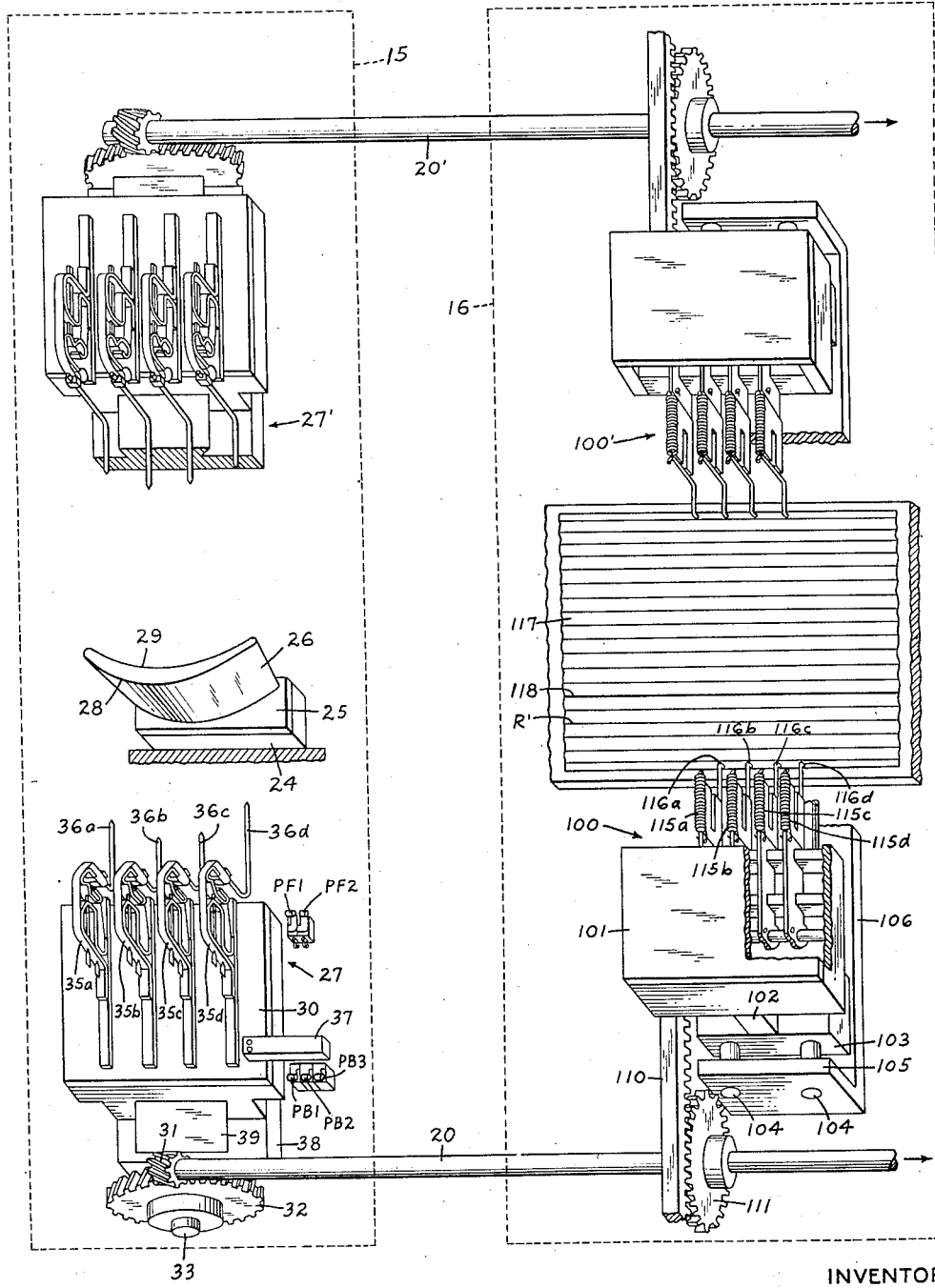
Figure 1B:
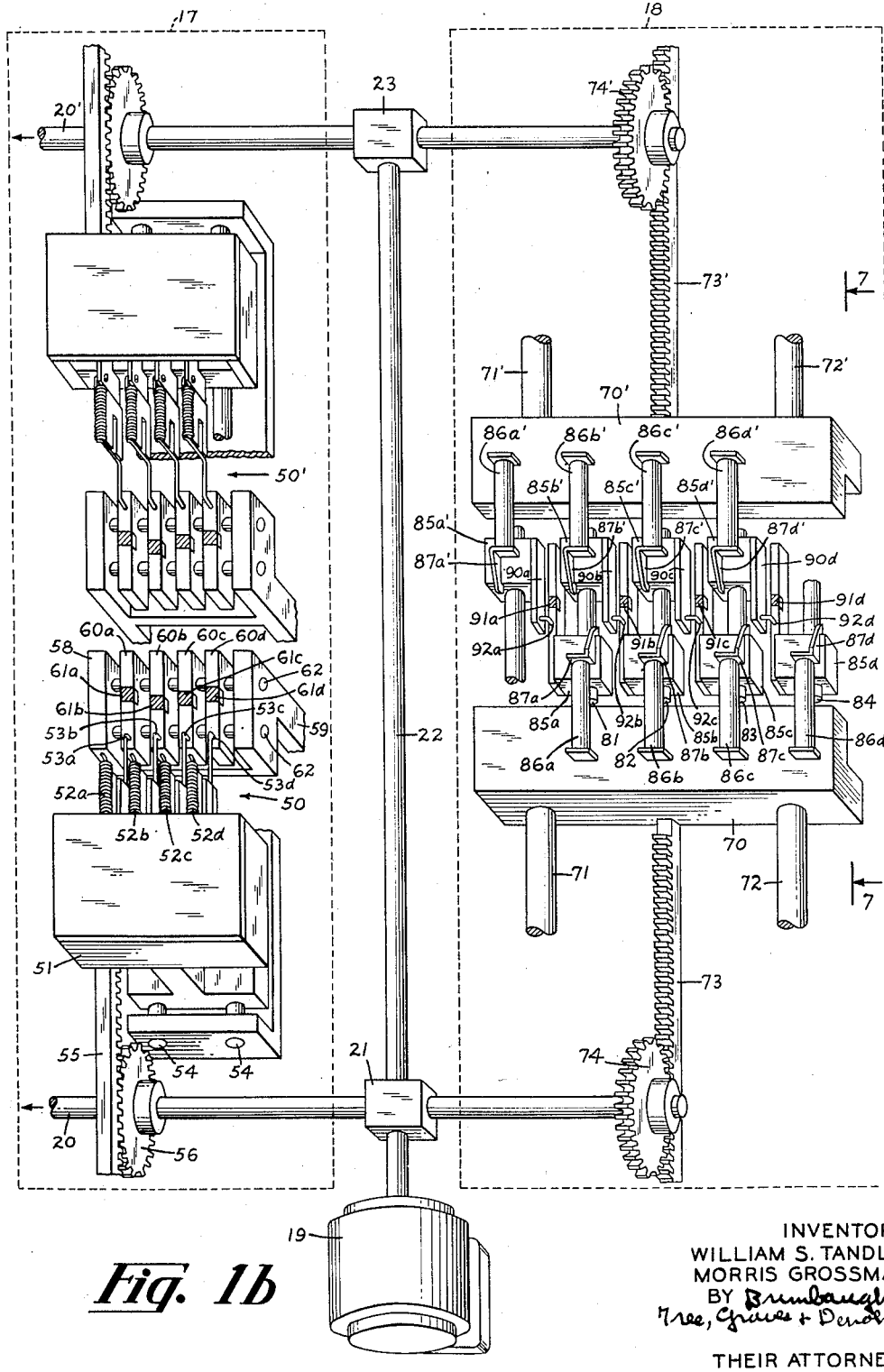

Referring to the schematic layout diagram of Figures 1a and 1b, this diagram illustrates the mechanical components of apparatus according to the present invention. For the sake of clarity, Figures 1a and 1b do not show in detail the electrical circuit components of this apparatus. In connection with these and other figures, it will be understood that any elements which are counterparts of each other are designated by the same reference number but by different suffixes for the reference number. Accordingly, it will be understood that, unless the context otherwise requires, any description hereinafter of an element with a given reference number and suffix is to be considered to apply also to any other element designated by the same reference number but by a different suffix.

The apparatus of Figures 1a and 1b comprises a probe unit 15, a recording unit 16, an individual tolerance unit 17, and a correlation tolerance unit 18. Each of these units is mechanically operated in synchronism by suitable synchronizing drive means which may be, say, hydraulic, but which in Figure 1b is shown as a reversible, selectively controllable, electric motor 19, and a pair of driving shafts 20, 20'. The shafts 20, 20' are each coupled to each of the aforementioned units, and are each driven at the same speed in synchronism with each other by a first gear box 21 which transmits the motor motion to both the shaft 20 and to a coupling shaft 22, and by a second gear box 23 which transmits the motion of coupling shaft 22 to driving shaft 20'.

The probe unit 15 includes a centrally positioned holder 24 for the base 25 of a mechanical part 26 (as, say, a turbine blade or airfoil) which is to be gauged to determine whether one or more dimensional conditions thereof conform to preselected tolerance standards for the part. The probe unit 15 also includes a pair of probe assemblies 27, 27' disposed on opposite sides of holder 24 to respectively gauge the front edge 28 and the back edge 29 of the part 26. Since the assemblies 27, 27' are essentially similar in construction, only the former assembly will be described.

In the assembly 27, a lower slide block 38 and an upper slide block 39 form a dovetail slide for a carriage 30 which is mounted on block 39 to be movable towards and away from the part 26. Selective backward and forward motion is imparted to carriage 30 from shaft 20 by means of a worm 31 on shaft 20, a worm gear 32 engaging worm 31, and a lead screw 33 which is rotated by gear 32 and which threadedly engages with a portion (not shown) of movable block 39 to impart a lonigtudinal motion thereto upon rotation of the lead screw. Since the worm 31, worm gear 32 and lead screw 33 together form a speed reducing mechanism, the carriage 30 will have a relatively slow backward and forward motion as compared to the motion imparted by shaft 20 to the later-described assemblies of units 16, 17 and 18.

The carriage 30 mounts thereon a plurality of probe holders 35a, 35b, 35c, 35d which in turn respectively carry a plurality of probes 36a, 36b, 36c, 36d in a horizontal array thereof. It will be understood that a greater or lesser number of probes may be used in any horizontal probe array, and that a plurality of horizontal probe arrays may be mounted one above the other on carriage 30 to provide simultaneous gauging at different levels of the front edge 28 of part 26. As taught in United States Patent No. 2,697,879 entitled "Indicating, Signaling and Recording Gauge" and issued to W. S. Tandler et al. on December 28, 1954, each of the probes is mounted in its probe holder to be yieldably movable back into the holder after contact has been made between the probe and part 26 in the course of forward movement of carriage 30 towards the part. This yieldability of the probes permits all of the probes to make contact with part 26 without any damage occurring to the probes which first make contact. As also taught in this patent, the tips of the probes in the array may be so aligned that, if the front edge 28 of part 26 is of a nominally ideal contour at the level of probe contact, all of the probes will simultaneously contact the front edge 28. The advantage of this alignment is later more fully described.

The carriage 30 also mounts thereon an actuating lever 37 which, at the designed backward and forward limits of travel of carriage 30, contacts the microswitches PB1, PB2, PB3, and the microswitches PF1, PF2, respectively. These microswitches, as later more fully described, control the movements of carriages 30 and 30'.

Figure 2:
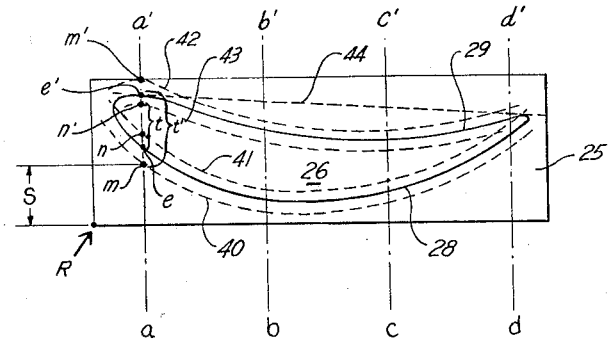
Figure 2 is a view illustrating different dimensional conditions of a mechanical part which may be gauged by the apparatus of Figure 1.

In Figure 2 are shown the various dimensional measurements of part 26 which are taken by the probes of probe assemblies 27, 27'. In this figure, the dot-dash lines $aa'$ $bb'$ $cc'$ and $dd'$ represent the loci of the paths taken by the probes of assemblies 27, 27' in contacting the part 26. Also, the dotted lines 40, 41 respectively represent an outside tolerance line and an inside tolerance line for the front edge 28 of the part. Similarly the dotted lines 42, 43 respectively represent the outside tolerance line and inside tolerance line for the back edge 29. The lines 40, 41 bound a two-dimensional tolerance envelope for the edge 28, while the lines 42, 43 bound a similar envelope for its edge 29.

Each tolerance line intersects a probe locus line at one point. Thus, the probe locus line $aa'$ is intersected by the tolerance lines 40, 41, 42, 43 at, respectively, the points $m$, $n$, $m'$, $n'$. The points in locus line $aa'$ where probes 36a, 36a', respectively, engage part 26 are designated as the points $e$ and $e'$. The distances bounded by the points $m$, $n$ and $m'$, $n'$ are respective tolerance zones for the part 26 at the points $e$ and $e'$ thereon.

The significance of the thickness distances $t$, $t'$ and of the chord line 44, all shown in Figure 2, will be later discussed.

The position of each tolerance line is accurately defined in space in relation to a single reference point which may be, say, the point R at the lower left-hand corner of the base 25 for the part 26. The point R is also usable as a reference for the rest of the Figure 1 apparatus inasmuch as the holder 24 holds the base 25 in an exactly known, preselected position in respect to the holder, and the rest of the apparatus can be referenced to the holder. Once this point R is established, the positions of the various tolerance lines may be defined by specifying for each tolerance line each distance (in the direction of probe movement), which the line has from the point R to the intersection of the tolerance line with a probe locus line. For example, the position of the tolerance line 40 at the intersection point $m$ thereof with the probe locus line $aa'$ is defined by specifying the distance $s$ in the direction of probe movement of this intersection point $m$ from the reference point R.

As stated, the probe assemblies 27, 27' may have several probe arrays at different levels to provide for three-dimensional gauging of the part 26. In this event, there will be a separate outside tolerance line and inside tolerance line for the front edge 28 at each level where this front edge is gauged. Such outside and inside tolerance lines at different levels serve to define a three-dimensional tolerance envelope for the front edge 28. A similar three-dimensional tolerance envelope may be defined in like manner for the back edge 29.

Returning to a consideration of the apparatus, at the start of a gauging operation the carriage 30 is at a starting position which is referenced to the point R in that at this starting position the distance between the carriage and the point R is accurately known. The gauging operation is initiated by energizing motor 19 to rotate shaft 20 to impart a forward movement, to carriage 30 in the manner described. This forward movement continues until each probe of carriage 30 has contacted the front edge 28 of part 26. As described in the aforementioned patent, the probes on carriage 30 and the part 26 are electrically interconnected so that the contact of each probe with the part serves to develop at the instant of contact an electric signal indicating that contact has been made. After each probe of carriage 30 has contacted part 26 to so develop an electric signal, the motor 19 is caused to reverse its rotation direction (as taught in the aforementioned patent) to retract the probes of carriage 30 from part 26 by a backward movement of carriage 30. This backward movement continues until the carriage reaches its starting position when the motor 19 is de-energized to thus terminate the gauging operation.

The individual tolerance unit 17 is utilized to determine whether each portion of part 26 contacted by a probe lies within or without the tolerance zone established for that portion in the manner shown for portions $e$ and $e'$ in Figure 2. The tolerance unit 17 comprises two separate assemblies 50 and 50' which are operated in respective conjunction with the probe assemblies 27 and 27'. Since assembly 50' is essentially similar in construction and operation to assembly 50, only the latter assembly need be described.

As shown in Figure 1b, the assembly 50 includes a carriage 51 for a plurality of stylus holders 52a, 52b, 52c, 52d which in turn respectively, carry a plurality of contact stylii 53a, 53b, 53c, 53d. These stylii are electrically connected to be in the respective circuits which carry the several electric signals developed by probes 36a–36d when these probes contact part 26. The carriage 51, which is slidably mounted upon guide rods 54, is adapted to be given a forward and backward movement along these guide rods by a rack bar 55 connected to the carriage and by a pinion 56 mounted on shaft 20 to engage with this rack bar. Comparison of the respective couplings of the probe carriage 30 and of the stylus carriage 51 to shaft 20 indicates that the movements of the two carriages will be synchronous and proportional, so that the travel of carriage 51 is representative of the travel of carriage 30. However, the travel of carriage 51 is a magnification of the travel of carriage 30.

As carriage 51 moves forward, the contact stylii 53a, 53b, 53c, 53d will be caused to respectively slide forward over the top of a plurality of tolerance indicating members 60a, 60b, 60c, 60d, which are mounted in side by side array within carriage side plates 58, 59 by a pair of posts 62 each of which has spaced annular slots along its extent to permit removal and replacement of individual tolerance members as later described. Each tolerance member along its top is characterized by a portion of length which acts as an insulator section. Thus the members 60a, 60b, 60c, 60d are respectively provided with the insulator sections 61a, 61b, 61c, 61d. Each tolerance member is constructed in a manner later described to permit adjustment of the insulator section thereof both as to the length of the section itself and as to the position of the section in the length of the member.

In connection with the preceding discussion the sections 61a–61d are "insulator" sections in the sense that the section 61a, for example, prevents conduction to the remainder of bar 60a of a probe contact signal supplied to stylus 53a if the signal is developed when the stylus is riding on section 61a. While the sections 61a–61d are represented in Figure 1b by the symbol for insulating material, it is not necessary, as later explained, that the entire lengthwise extent of these sections be actually composed of insulating material.

Considering now the inter-relationship between the probe unit 15 and the individual tolerance unit 17, as a preliminary to gauging, in probe unit 15 (Figure 1a) the probes 36a, 36b, 36c, 36d are adjusted in position in their holders so that the tip of each probe will be at a known preselected distance (in the direction of probe movement) from the reference point R (Figure 2) when the carriage 30 is located at its standard starting position for a guaging operation. This may be done by referencing the tips of the probes to carriage 30 which, as already described, is referenced in starting position to the point R. By so adjusting the probes, it is possible to determine the starting distances from each probe to the points marking the outside and inside tolerance values for the portion of part 26 contacted by the probe. For example, it is possible to determine the starting distances of the tip of probe 36a from points $m$ and $n$ (marking the tolerance values for portion $e$ of part 26) by adding the known distances of points $m$ and $n$ from R to the starting distance of probe 36a from R.

As a second preliminary to gauging, in each of the tolerance indicating members of unit 17, the insulator section thereof is so adjusted in its own length and in its position on the length of the member that, taking into account the magnified but proportional relation between the travels of probe carriage 30 and tolerance carriage 51, the insulator section bears the same distance relation to its associated contact stylus in starting position as does the corresponding probe in starting position to the tolerance zone of the portion of part 26 which is contacted by the probe. For example, insulator section 61a is adjusted on member 60a so that the margin of the section nearest stylus 53a is a distance therefrom equal to the distance of the tip of probe 36a from point $m$ (Figure 2) multiplied by the magnification ratio of the travel of carriage 51 to the travel of carriage 30. The margin of section 61a remote from stylus 53a is adjusted to be in like manner representative of the distance of the tip of probe 36a from point $n$.

It will be noted that the above described mode of adjusting the insulator sections does not depend upon any particular relation between the alignment between themselves of the probes in starting position and the alignment between themselves of the contact stylii in starting position. For example, the probes 36a–36d, as shown in Figure 1a, may have a bowed alignment representative of the ideal contour for edge 28 of part 26, and yet the corresponding contact stylii 53a–53d may be linearly aligned, in which case the insulator sections 61a–61d will be more or less linearly aligned.

From what has been said, it will be seen that in the period of a gauging operation when the probes are being moved forward towards part 26, the contact stylii will be likewise moved forward in such manner that the instantaneous position of each contact stylus in respect to the insulator section of the associated tolerance member represents in a magnified but proportional manner the instantaneous distance of the corresponding probe in respect to the tolerance zone of the portion of part 26 which is contacted by the probe. If this portion lies without its tolerance zone, the signal developed in response to contact of the portion and the probe will occur at a time when the corresponding contact stylus is touching the top of its associated tolerance member to one side or the other of the insulator section of the member. In this instance, there will be formed between the contact stylus and its associated tolerance member a signal path for the probe contact signal which thereupon causes the apparatus of Figure 1 to go through a recording operation subsequent to the gauging operation to provide a two step cycle of operation. If on the other hand, the portion of part 26 contacted by a probe lies within the tolerance zone for this portion, the signal developed upon contact of the probe and the portion will occur at a time when the corresponding contact stylus touches its associated tolerance member at a point within the insulator section for the member. In this latter instance, no signal path through the contact stylus and tolerance member will be provided which will permit the probe contact signal to initiate recording. Thus, in this latter instance a cycle of operation for the Figure 1 apparatus will consist entirely of the single step of a gauging operation rather than a gauging operation followed by a recording operation. Whether a given cycle includes only gauging or both gauging and recording, each reversed rotation of motor 19 which brings the probes back to starting position also brings the stylus carriages 51, 51' back to starting position.

The several contact stylii 53a–53d and tolerance members 60a–60d are electrically inter-connected (in a manner later described more fully) so that if any one stylus and associated tolerance member provide a signal path for the contact signal of the corresponding probe at the time this signal is developed, the flow of contact signal through just this one signal path will cause a subsequent recording operation to be initiated for the Figure 1 apparatus. Thus, a recording operation will be initiated if any probe-contacted portion of part 26 lies without the pre-established tolerance zone for this portion. If, on the other hand, all of the probe-contacted portions of part 26 lie within the respective tolerance zones which have been pre-established therefor, the recording operation is dispensed with, and the cycle of operation of the Figure 1 apparatus is completed at the same time as the completion of the gauging operation.

The Figure 1 apparatus is thus characterized by an operational cycle which may be selectively a one-step gauging cycle or a two-step gauging and recording cycle. When by the gauging step it is found that a mechanical part satisfies the preselected tolerance requirements therefor in all respects, the part is accepted without further recording of its dimensional characteristics since, in this instance, such further recording would be superfluous. If, on the other hand, it is found by gauging that a given mechanical part violates the preselected tolerance requirements therefor in at least one respect, a further recording step is automatically carried out to determine which of the gauged dimensional characteristics of the part is violative of its tolerance requirement.

It will be noted that a tolerance unit 17 of the sort described is advantageous in that tolerance members of identical construction may be used therein, and that, yet, the tolerance members may be individually adjusted to define the respective tolerance requirements of parts to be gauged of widely differing form. Also, the tolerance unit 17 is advantageous in that tolerance members may be permanently adjusted in sets such that each set defines the desired tolerances of each part to be gauged of different form. In this manner it is possible to set up the Figure 1 apparatus to gauge a new particularly shaped part by merely replacing the previous set of members in unit 17 with a set of members which go with this new part.

The tolerance unit 17 which has been described is a unit which indicates whether or not the probed portions of the part 26 lie within tolerance limits which are individually established for each of these portions. It is entirely possible, however, that each such portion of part 26 will satisfy the individual tolerance requirements therefor, and that, yet, the part will be violative of some other tolerance requirement in the nature of a correlation tolerance. For example, the portion $e$ gauged by probe 36$a$ may lie between the points $m$ and $n$ to satisfy these individual tolerance limits for portion $e$, and the portion $e'$ gauged by probe 36$a'$ may lie between points $m'$ and $n'$ to likewise satisfy these individual tolerance limits for portion $e'$ and, yet the distance between points $e$ and $e'$ may be less than a minimum thickness tolerance $t$ (Figure 2) which has been preestablished as a necessary thickness for the part 26 between the points $e$ and $e'$. In like manner, the points $e$ and $e'$ although satisfying their individual tolerance limits $m$, $n$ and $m'$, $n'$ may be spaced so far apart that they are violative of a maximum thickness tolerance $t'$ for the part 26 between the portions $e$ and $e'$. This situation that all gauged portions of part 26 may satisfy individual tolerances therefor but may violate correlation tolerances therefor is a situation which comes into being when the correlation tolerance requirements are more rigid than the individual tolerance requirements.

The determination of whether or not the part 26 is satisfactory in respect to the correlation tolerance of thickness is determined by the unit 18. This unit includes a pair of carriages 70, 70' which are respectively slidable on pairs of guide rods 71, 72 and 71', 72'. The carriage 70 is adapted to be slid on its guide rods by means of a motion transmitting coupling to shaft 20 consisting of a rack bar 73, connected to the carriage, and a pinion 74 mounted on shaft 20. Similarly the carriage 70' in the course of a gauging operation is adapted to be slid on its guide rods 71', 72' through a motion transmission coupling to shaft 20' consisting of a rack bar 73' connected to carriage 70' and a pinion 74' mounted on shaft 20'. The motion transmission couplings 73, 74 and 73', 74' are of such nature that as motor 19 rotates shafts 20, 20' to move the probe carriages 30, 30' simultaneously towards the part 26, the shaft rotations also move the carriages 70, 70' from respective starting positions away from each other to produce a relative separating motion of the carriages. Comparison of the respective couplings of carriages 30, 30' and of carriages 70, 70' to shafts 20 and 20' indicates that the distance traveled by the latter carriages will correspond in magnified but proportional relation to the distance traveled by the former carriages.

Between the carriages 70 and 70' are disposed a plurality of rods 80, 81, 82, 83, 84 which are each aligned in the direction of relative carriage movement, and which are laterally spaced from each other. The last-four named of these rods respectively support in freely slidable relation a plurality of traveler blocks 85$a$, 85$b$, 85$c$, 85$d$, which are disposed on the rods towards the carriage 70 and away from the carriage 70'. The first four named of these rods respectively support in freely slidable relation a plurality of traveler blocks 85$a'$, 85$b'$, 85$c'$, 85$d'$ which are disposed on the rods towards the carriage 70' and away from the carriage 70. As will soon be described, the blocks 85$a$ and 85$a'$ are paired to co-operate together, and the other blocks are paired in like manner. The described staggered spatial arrangement of the opposing groups of blocks wherein for example, block 85$a$ slides on the same rod as the block 85$b'$ (not paired with block 85$a$), permits the use of a lesser number of rods than would be necessary if a non-staggered arrangement were used so that, say, each block slid upon its own individual rod.

Prior to the start of a gauging operation in a given operational cycle, each of the traveler blocks 85$a$–85$d$ is located at a reference position on the rod on which it slides. These blocks have been brought into this reference position at the end of the preceding gauging operation by the action of carriage 70 which, pushed the blocks ahead of it as the carriages 70, 70' relatively closed with each other in the course of being reset to starting position. The blocks 85a–85d were thus deposited in reference position when the carriage 70 came to rest. In like manner, the blocks 85a'–85d' have been brought to reference position by the carriage 70'.

For the purpose of moving the block 85a away from reference position, the carriage 70 has mounted thereon a solenoid 86a which is in circuit with the probe 36a to be energized when this probe develops its contact signal upon making contact with part 26. The solenoid 86a carries at the front thereof a latch arm 87a which is depressed when the solenoid is de-energized so that the free end of the latch arm overhangs the face of block 85a remote from carriage 70 to provide a latching action with this face. Thus, so long as solenoid 86a remains de-energized, the traveler block 85a will be drawn along by carriage 70 as the same moves in separation from carriage 70'. When, however, the solenoid 86a is energized in response to the signal developed when the corresponding probe 36a contacts part 26, the solenoid 86a raises latch arm 87a to unlatch block 85a from carriage 70. Upon being unlatched, the block 85a comes to rest although the motion of the carriage 70 continues.

In a like manner to that just described, the blocks 85b, 85c, 85d are initially all latched with the carriage 70 but may be selectively unlatched to come to rest while the motion of the carriage continues. The blocks 85'a–85'd are in like manner initially latched with carriage 71', but may be selectively unlatched to come to rest while the motion of carriage 70' continues.

The block 85a mounts to one side thereof a thickness gauging member 90a which extends towards the carriage 71'. The gauging member 90a is characterized by an insulator section 91a which extends part way along the top surface of the gauging member, and which is adjustable both as to the length of the section and as to the position of the section in the entire length of the top surface of the gauging member. To complete the thickness gauging arrangement, the block 85a' carries an electrical contactor 92a' which slides along the top of gauge member 90a as the blocks 85a and 85a' are moved in separation with each other.

Considering now the relations which exist between the probe unit 15 and the thickness unit 18, initially two opposing probes, as, say, the probes 36a and 36a', will be separated from each other by a known preselected distance which will be referred to hereinafter as the "initial interprobe distance." This initial inter-probe distance is the sum of the distances of probes 36a and 36a' from point R (Figure 2). Also, at the start of a gauging cycle each contactor of the thickness unit will touch the top of its associated thickness gauge member at a starting position which is a known position in respect to the length of the gauging member. This is so, since as described the traveler blocks which carry each paired contactor and gauging member will be each returned to a respective reference position before the start of a new gauging operation. For example, the contactor 92a' initially touches the top of gauging member 90a at a starting position which is a known position in respect to the length of gauge member 90a. As stated, comparison of the couplings, which respectively transmit motion from shafts 20, 20' to the probe carriages 27, 27' and from these shafts to the thickness carriages 70—70', indicates that the travel of each of the latter carriages will be in magnified but proportional relation to the travel of the former carriages.

Accordingly, it will be seen that as, say, the opposing probes 36a and 36a' move from their starting positions towards the part 26, the relative distance traveled by contactor 92a' from its starting position over the length of gauging member 90a will represent in magnified but proportional relation the sum of the distances traveled by the probes 36a and 36a'. This relative travel of contactor 92a' continues to represent the sum of the distances traveled by the corresponding opposing probes until one of the probes, as, say, the probe 36a, makes contact with the part 26 to be brought to rest. At this time, the solenoid 86a is energized in response to the contact signal from probe 36a to raise the latch arm 87a to thereby bring to rest the block 85a and the gauging member 90a carried thereby. From this time on, the relative travel of contactor 92a' over gauge member 90a represents only the distance traveled by the probe 36a' on its way to making contact with part 26. When probe 36a' makes such contact to be thereby brought to rest, the signal developed by such contact causes solenoid 86a' to be energized to raise latch arm 87a' to bring to rest block 85a' and the contactor 92a' carried thereby.

It will thus be seen that at the time the second one of blocks 85a, 85a' comes to rest, the total relative distance traveled by contactor 92a' over gauging member 90a from its starting position thereon will be representative of the total distance traveled by both probes 36a and 36a' before contact is made with part 26 by both probes. This last-named distance is, of course, equal to the initial inter-probe distance minus the thickness of part 26 between the portions e and e' (Figure 2) of the part.

The determination as to whether this actual thickness of part 26 between, say, portions e and e' is within the tolerance requirement therefor is made in the following manner. The insulator section 91a is adjusted on gauging member 90a so that the margin of this section nearest to the starting position on member 90a for contactor 92a' is located from this position by a distance which (taking into account the magnified but proportional relation in the travel of carriages 70, 70' and of carriages 27, 27') is representative of the initial inter-probe distance, minus the maximum thickness of part 26 which can be tolerated in the region where probes 36, 36a make contact. In other words, the distance of this nearest margin from the starting position of contactor 92a' on member 90a is equal to the sum of the known distances of probes 36a and 36a' at starting position from point R (Figure 2) minus the maximum thickness tolerance distance t (Figure 2), all multiplied by the magnification ratio of the relative travel between carriages 70, 70' to the relative travel between carriages 27, 27'. Also, the margin of insulator section 91a which is farthest from the starting position of contactor 92a' on member 90a is located the distance from this position which (taking into account the magnified but proportional travel relation of the probe unit carriages and thickness unit carriages as before) is representative of the initial inter-probe distance minus the minimum thickness which can be tolerated for part 26 in the region where probes 36a, 36a' make contact. In other words, the distance of this farthest margin from the starting position of contactor 92a' on member 90a is equal to the sum of this distance of probes 36a and 36a' from point R (Figure 2) minus the minimum thickness tolerance distance t' (Figure 2), all multiplied by the said magnification ratio.

When insulator section 91a is positioned as described, at the time the contactor 92a' and the gauge member 90a have relatively come to rest, the spatial relation between this contactor and the insulator section is indicative in the following manner of whether the actual thickness between portions e and e' of part 26 meets the preselected thickness tolerance requirement therefor. If the contactor 92a' comes to rest on gauge member 90a within the insulator section 91a, this fact is indicative that the considered thickness is within the tolerance requirement therefor. Conversely, if the contactor comes to rest outside the insulator section 91a, this last-named fact is indicative that the considered actual thickness of part 26 does not meet its preselected tolerance requirement. If the contactor has not reached the insulator section before coming to rest, an indication is provided that the considered actual thickness exceeds its maximum tolerance. If on the other hand, the contactor overshoots the insulator section before coming to rest, an indication is provided that the considered actual thickness is less than its minimum tolerance.

The contactor 92a' is electrically interconnected with the gauging member 90a such that if the contactor comes to rest outside of section 91a, a closed signal path is provided for a signal which, as later described, is developed at the end of the gauging operation. If this closed signal path is present, the developed signal will cause the Figure 1a and 1b apparatus to follow up the gauging operation which took place by a recording operation. If, on the other hand, the contactor 92a' comes to rest within the insulator section 91a, no closed signal path is provided, and the developed signal is ineffective to initiate a recording operation for the Figure 1a and 1b apparatus.

Each contactor and paired gauging member of unit 18 is electrically interconnected in like manner to that just described for contactor 92a' and its paired gauging member 90a. Moreover, each paired contactor and gauging member is electrically interconnected with the other paired contactors and gauging members so that, if any one contactor and its paired gauging member provide a closed signal path after the contactor has come to rest, the signal developed at the end of the gauging operation will pass through this closed signal path to cause the Figure 1 apparatus to follow up the gauging operation by a recording operation. Moreover, the individual tolerance unit 17 and the correlation unit 18 are so electrically connected that they are independently capable of controlling the Figure 1a and 1b apparatus. If either unit indicates that a tolerance requirement set up thereby has been violated, the Figure 1a and 1b apparatus will be caused in a given operational cycle to follow up by a recording operation the gauging operation of the cycle.

The correlation tolerance unit 18 is characterized by a number of advantages of which some might be mentioned. First, as in the case of the tolerance members of unit 17, the gauging members of unit 18 although identical in construction may, by virtue of their adjustable insulator sections, be set up to establish thickness tolerance requirements for mechanical parts 26 of widely differing form. Second, as is also true of the tolerance member of unit 17, the gauging members of unit 18 may be permanently adjusted in sets such that each set defines the tolerance requirements for a differently shaped mechanical part. Thus, when a part to be gauged is of new shape in relation to the part last gauged, this new part may be gauged by substituting the set of permanently adjusted gauging members which go with the new part for the set of gauging members utilized with the previously gauged part. In this manner, it is possible to avoid the time-consuming labor of readjusting the length and position of the insulator sections of the gauging members each time a part of new shape is to be gauged.

As a third advantage, the unit 18 is capable of determining whether a correlation tolerance between two portions of a gauged part is jointly met by these portions despite the fact that the two portions are individually gauged at different times during the course of a gauging operation. As a fourth advantage, the unit 18 is capable of determining whether a gauged part meets a correlation tolerance such as thickness even though the distance representing the correlation tolerance has no assigned position in space in relation to a reference point utilized in determining individual tolerances. To clarify what is meant by the last statement, the thickness tolerance distances $t$ and $t'$ (Figure 2) have no assigned spatial position in relation to reference point R, and are thus in contrast to the tolerance points, $m$, $n$ and $m'$, $n'$ which are spatially fixed in relation to point R.

The recording operation of the Figure 1a and 1b apparatus is performed by a recording unit 16 which includes a pair of recording assemblies 100, and 100'. Since both assemblies are essentially similar, only the assembly 100 will be described in detail.

The assembly 100 includes a carriage 101 mounted on a web 102 which is in turn mounted on a block 103. The block 103 is freely slidable on a pair of horizontal guide rods 104 which are end supported by a plate 105 upstanding from one end of a base 106. The carriage 101 is thus slidably mounted to be freely movable towards and away from the opposing recording assembly 100'.

Forward and backward movement is imparted to carriage 101 by a motion transmission coupling of this carriage to shaft 20. This coupling comprises a rack bar 110 connected to carriage 101 and a pinion 111 mounted on shaft 20 to engage with rack bar 110. Comparison of the respective couplings of probe carriage 30 to shaft 20 and of recording carriage 101 to shaft 20 indicates that, in the presence of shaft rotation, the amount of travel undergone by carriage 101 is in magnified but proportional relation to the amount of travel undergone by carriage 30.

The carriage 101 mounts thereon a plurality of stylus holders 115a, 115b, 115c, 115d which respectively carry a plurality of recording styli 116a, 116b, 116c, 116d. These styli 116a–116d are respectively connected electrically with the probes 36a–36d to each receive the signal developed by the corresponding probe when the same makes contact with part 26 in the course of forward movement of probe carriage 30. Moreover, the styli 116a–116d are maintained in contact with a recording medium 117 which is sensitized to produce a visible mark from a stylus when that stylus is electrically activated by the signal received from its corresponding probe to pass a current through the medium. This recording medium may be a recording sheet of Teledeltos paper, for example.

Both the array of probes 36a–36d and the array of styli 116a–116d may be aligned in various ways. Assume, for example, that the tips of probes 36a–36d are in linear array. Then, each stylus will be adjusted in its holder so that when carriage 101 is in starting position, the distance (in the direction of stylus movement) of the stylus from a reference point R' on the recording sheet 117 is representative of the distance of the corresponding probe in starting position from the reference point R (Figure 2) on part 26. Thus, for example, stylus 116a would be adjusted so that in starting position the stylus is displaced in the stylus movement direction from the point R' in an amount to be equal to the displacement of probe 36a in starting position from point R, multiplied by the magnification ratio of the travel of carriage 101 compared to that of carriage 30. With such mode of alignment, the styli 116a–116d will record on sheet 117 a set of marks which indicate in a magnified but proportional manner the actual contour of front edge 28 of part 26. In this contour record, the displacement of each constituent mark from point R' is representative in a magnified but proportional manner of the displacement from point R of the portion of part 26 which is contacted by the probe which causes the mark to be produced.

As another form of alignment, the several probes 36a–36d may be aligned in the bowed configuration shown in Figure 1 so that each probe in starting position is the same distance from a nominally ideal contour for front edge 28. This ideal contour is, for example, defined by a line (not shown) which at all points is half way between the tolerance lines 40 and 41 (Figure 2). The styli 116a–116d are then adjusted in their respective holders so that, in the starting position for carriage 101, each stylus is displaced from a reference line 118 on sheet 17 in an amount which is equal to the displacement of the probes in starting position from the ideal contour line, multiplied by the magnification ratio of the travel of recording carriage 101 compared to that of probe carriage 30. With such adjustment, it will be seen that the probes 116a–116d will be linearly aligned. It will also be seen, with such adjustment, that during recording the marks respectively recorded by the styli will each be referenced to the line 118 on record sheet 117 in the following manner. If a mark appears below line 118 as seen in Figure 1a, the displacement of the mark from this line represents in a magnified but proportional manner the over-displacement from the ideal contour line of the portion of part 26 which is contacted by a probe to result in the making of the mark. If the mark is on line 18, the said portion conforms perfectly to the ideal contour line. If the mark is above line 18 as seen in Figure 1a, the displacement of the mark from this line represents in a magnified but proportional manner the under-displacement of said portion from the ideal contour line.

As mentioned heretofore, in each operation cycle of the Figure 1a and 1b apparatus a follow-up recording operation is initiated each time the gauging operation of the cycle has established (by way of an indication from either individual tolerance unit 17 or correlation tolerance unit 18) that the part gauged does not need a tolerance requirement in some respect. The recording operation is initiated only after the forerunning gauging operation has been fully completed by return of the probe carriage 30 to starting position so that both this carriage 30 and the recording carriage 101 are in starting position.

When this reset condition has been reached, the recording operation takes place by energizing motor 19 to move probe carriage 30 towards part 26, and to synchronously move the recording carriage 101 forward so that the styli 116a–116d move over the recording sheet 117. As each probe of the probe carriage 30 contacts part 26, the corresponding stylus of carriage 101 produces a mark on sheet 117 in the manner described. After all of the probes 36a–36d have contacted part 26, the direction of rotation of motor 19 is automatically reversed to terminate the recording operation by returning both of the carriages 30 and 101 to their respective starting positions. Upon so returning both carriages to starting position, the motor 19 is de-energized until such time as a new cycle of operation is to be carried out by the Figure 1a and 1b apparatus.

It is preferable, although not necessary, that the recording unit 16 be maintained in a dwell condition during the gauging operation wherein the tolerance units 17, 18 determine whether or not a recording operation is necessary. Likewise, it is preferable, although not necessary that the tolerance units 17 and 18 be maintained in a similar dwell condition during the recording operation carried out by probe unit 15 and recording unit 16. Such dwell periods for the units 16, 17 and 18 may be obtained by incorporating suitable electromagnetic clutch mechanisms in the motion transmission couplings between each of units 16, 17, 18 and each of shafts 20, 20'. These clutch mechanisms which, for the sake of simplicity are not shown in Figure 1, may be selectively energized and de-energized by a control system for motor 19 to couple the units 17, 18 to the shafts 20, 20' only during the preliminary gauging operation, and to couple the recording unit 16 to the shafts 20, 20' only during any recording operation which may take place.

Figure 3:
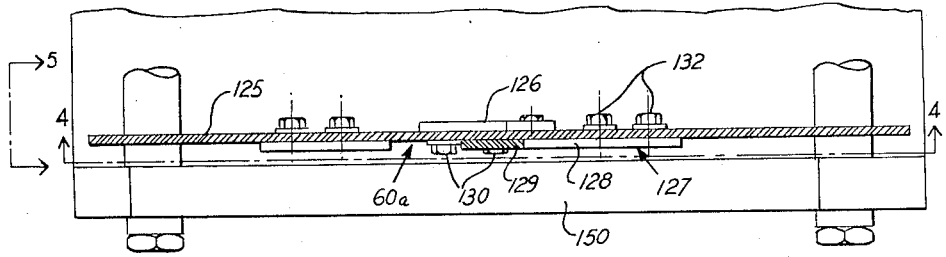
Figure 3 is a detailed plan view of a broken away section of the individual tolerance unit in the part of the apparatus shown in Figure 1b.
Figure 4:
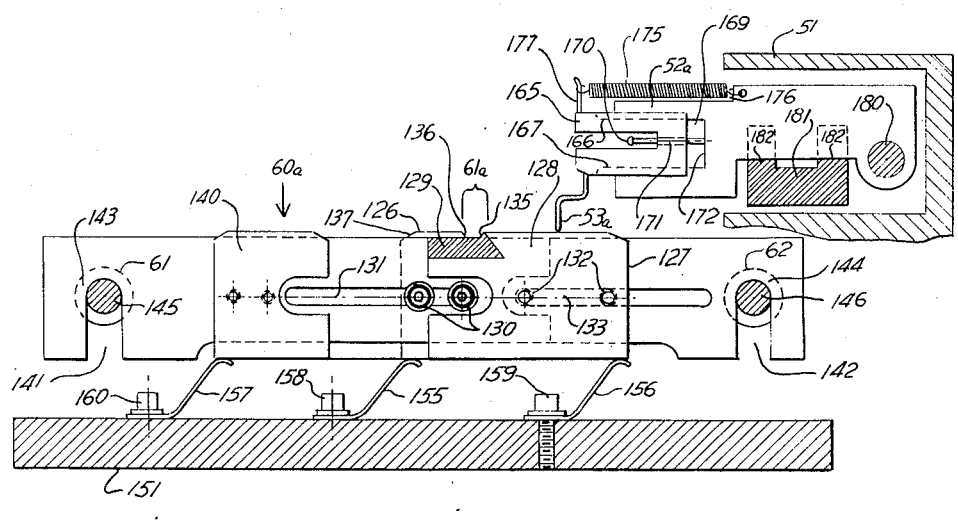
Figure 4 is a side elevation of the section of the tolerance unit of Figure 3, the side elevation being taken partially in cross-section as indicated by the arrows 4—4 in Figure 3.
Figure 5:
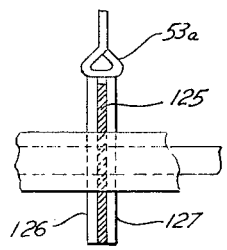
Figure 5 is a fragmentary front elevation of the section of the tolerance unit of Figure 3, the front elevation being taken as indicated by the arrows 5—5 in Figure 3.

Figures 3, 4 and 5 show details of the individual tolerance unit 17. Referring to these figures, Figure 3 (which, for clarity, omits a showing of the contact styli and holders therefor) and Figure 4 illustrate that each of the individual tolerance members is in the form of a composite bar. Thus, as shown, the member 60a consists of a central strip 125 of insulating material, a side strip 126 of electrically conducting material such as brass, and another side strip 127 which is mostly formed of a portion 128 of electrically conducting material, but which has a tab 129 (Figure 4) of insulating material at the upper left-hand corner thereof. The side strip 126 is bolted to one side of the central insulating strip 125 by a pair of bolts 130 which pass from the opposite side of strip 125 through a longitudinal slot 131 therein, and into threaded holes (not shown) in the strip 126. Similarly, the strip 127 is bolted to central insulating strip 125 on the side thereof away from strip 126 by a pair of bolts 132 which pass from the side of strip 125 to which strip 126 is bolted, through a longitudinal slot 133 in strip 125, and into threaded holes (not shown) in strip 127. By loosening and tightening the bolts 130 and 132, either of strips 126 and 127 may, independently of the other, be adjusted in longitudinal position along the length of the central strip 125.

The top surface of the conducting portion 128 is slightly raised for most of its extent above the top surface of central strip 125. However, at its left-hand end (Figure 4) the conducting portion 128 has a chamfer 135 such that the top surface thereof slopes to meet the top surface of insulator tab 129. This last-named top surface is at the same level as the top surface of central insulating strip 125. The side strip 126 has a chamfer 136 at its right-hand end (Figure 4) and another chamfer 137 at its left-hand end so that the top surface of the strip is caused by the chamfers to slope down at both ends below the top surface of the central insulating strip 125. From what has been said, it will be seen that the chamfers 135 and 136 define therebetween a longitudinal zone of which the length and the relative position thereof in respect to the length of strip 125 can both be adjusted by appropriate position adjustments of the strips 126 and 127. As later explained, the referred to zone is the insulator section 61a heretofore described.

The strip 125 also carries, on the far side of insulation section 61a from stylus 53a, another conducting strip 140 whose purpose will be later described. The top surface of strip 140, although slightly raised for most of its extent above the top surface of strip 125, is chamfered at both ends to slope down to the top surface of strip 125.

The bottom edge of strip 125 has deep notches 141, 142 formed therein at the two ends of the strip. These notches are adapted to pass through respective annular slots 143, 144 of the mounting pins 61, 62 (Figures 1 and 4) in such manner that these notches receive in close-fitting relation the circular cores 145, 146 which are the portions left of the posts 61, 62 after the annular slots 143, 144 have been formed therein. In this manner the tolerance member 60a and each other tolerance member is supported by the pins 61, 62 to be locked against either longitudinal movement or lateral movement. At the same time, any tolerance member can be conveniently removed from posts 61, 62 and replaced by another tolence member as occasion warrants. The mounting pins 61, 62 are themselves supported at each end by the insulating side plates 58, 59 (Figure 1b) which rise up from a base 151 (Figure 4) composed of insulating material.

Suitable electrical contacts between the conducting strips 126, 127 and 140 and the circuits of which these strips are a part are made by, respectively, the leaf springs 155, 156, 157 which are connected at one end to, respectively, the terminals 158, 159, 160 on base 151, and which rise from these terminals to respectively contact the said strips on the under sides thereof. The terminals 158, 159, 160 are electrically connected as later described.

As best shown in Figure 5, the stylus 53a for tolerance member 60a is of spade form to straddle the strips 125, 126, 127 which make up the tolerance member. The slight rise of the top surfaces of conducting strips 126, 127 (Figure 4) above the top surface of insulating strip 125 assures that stylus 53a will at all times make good contact with the conducting strips as it passes thereover. Also, the chamfers formed in the conducting strips serve to provide a smooth transition for stylus 53a as it rides off one of the strips onto the insulating strip 125 or rides onto one of the conducting strips from the insulating strip.

As shown in Figure 4, the stylus 53a may be adjustably positioned in respect to its holder 52a by an arrangement wherein the stylus is affixed to a rectangular plate 165 whose upper and lower faces contain longitudinal slots 166, 167 which receive the upper and lower longitudinal marginal edges of a deep rectangular notch 169 cut into the holder. The plate may be longitudinally adjusted in position in slot 169 by an adjusting screw 170 which is threadedly received in a hole 171 in the plate, and which passes through this hole to bear against the back margin 172 of slot 169.

To assure that screw 170 continuously bears against back margin 172, the plate 165 is spring loaded by a tension spring 175 of which one end is attached to shoulder 176 formed in holder 52a, and of which the other end is attached to a post 177 upstanding from plate 165.

The holder 52a is replaceably mounted on the carriage 51 by a removable insulating rod 180 which passes from one side of the carriage through a hole formed in the holder and to the other side of carriage 51. To provide lateral spacing between the several stylus holders mounted by carriage 51, there is utilized an insulating member 181 which extends laterally from side to side of the carriage 51, and which, longitudinally, is of rectangular U cross section. The member 181 is notched at regular lateral intervals by longitudinally-running notches 182, which at each lateral interval provide a straight passageway through both upstanding legs of the U cross section. The member 181 is thus of comb form. As shown in Figure 4, the holder 52a extends through the passageway formed by one set of notches 182 to be held in fixed lateral position by comb member 181. The other holders are held in laterally fixed position in like manner.

Figure 6:
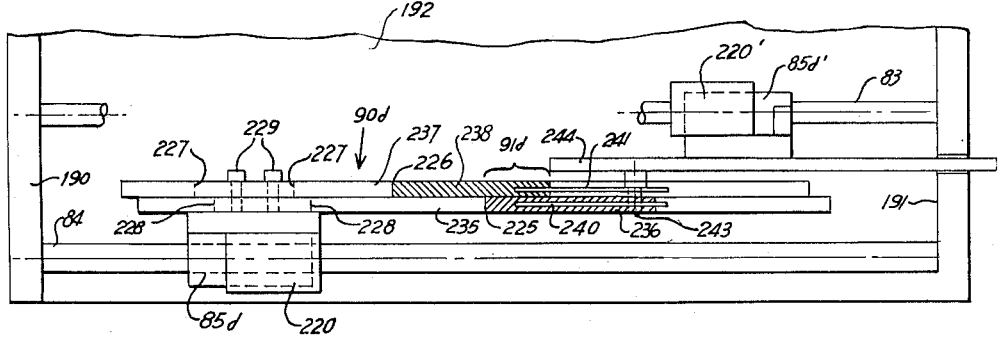
Figure 6 is a detailed plan view of a broken away section of the correlation tolerance unit in the part of the apparatus shown in Figure 1b.
Figure 7:
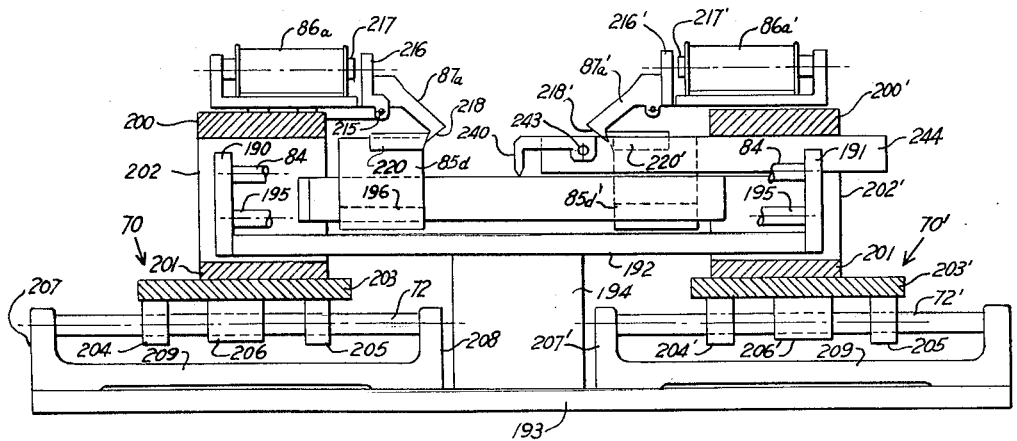
Figure 7 is a side elevation of the correlation tolerance unit, this side elevation being taken as indicated by the arrows 7—7 in Figure 1b.

Figures 6 and 7 show details of the correlation tolerance unit 18 of Figure 1. For convenience, the carriages 70, 70' and associated components are omitted from the showing of Figure 6. As is best seen in Figure 7, the guide rods 80–84 which slidably support the traveler blocks 85a–85d and 85a'–85d' are supported at their ends by plates 190, 191 which extend upward from the two ends of a base plate 192. The plate 192 is in turn supported above a base 193 by a central pedestal 194. Beneath the set of rods 80–84 (Figure 1) there are positioned a second parallel set of steadying rods which pass through grooves formed in the bottoms of traveler blocks 85a–85d and 85a'–85d' to maintain these blocks in up and down position on the rods 80–84. A steadying rod of this sort is represented in Figure 7 by the rod 195 which passes through the groove 196 formed in the bottom of block 85d.

The carriage 70 comprises a top plate 200 which is supported in spaced relation above a base plate 201 by a pair of side plates 202 which extend upward from the longitudinal margins of the base plate to the longitudinal margins of the top plate. One of these side plates 202 is shown in Figure 7. The base plate 201 is mounted on a support plate 203 which is longitudinally movable back and forth by virtue of being mounted on three slide blocks 204, 205, 206. The first two-named blocks are slidable on the guide rod 72, and the last-named block is slidable on the guide rod 71 (Figure 1). The guide rods 71, 72 are supported by the upturned ends 207, 208 of a frame 209 mounted on the base 193. The space enclosed by the top plate 200, the base plate 201 and the side plates 202 is sufficiently large in lateral vertical cross section to permit passage through this space of the end plate 190 and base 192 from which the rods 80–84 are supported. Thus the carriage 70 may be freely moved back and forth on its guide rods 71, 72 without being obstructed by the mentioned end plate 190 and base plate 192.

As shown in Figure 7, the latch arm 87a is pivoted by the pin 215 to be rotatable thereabout. Also, the latch arm has attached to the back end thereof an armature 216 which is spaced a short distance from the pole piece 217 of solenoid 86a when this solenoid is deenergized. The free end of the latch arm 87a carries a latching claw 218 with a reversely slanted back face in the nature of a contact face. The traveler block 85d mounts on its top a latch block 220 whose front face is given an undercut bevel such that the angle of the front face of the latch block matches the angle of the contact face of the latch claw 218.

As the carriage 70 moves forward during the reset period of a gauging operation, the top plate 200 of the carriage will move with clearance over the back portion of the traveler block 85d, but will engage with the back face of the latch block 220. By this engagement of top plate 200 with latch block 220, the carriage 70 will push the traveler block 85d to a reference starting position as heretofore described. In such starting position the latch claw 218 will overhang the beveled front face of latch block 220. Thus, when the carriage 70 moves reversely in the gauging period of a gauging operation, the carriage 70 will draw the traveler block 85d with it (as heretofore described) until solenoid 86a becomes energized. This energization of the solenoid causes pole piece 217 to attract armature 216 which in turn causes latch arm 87a to be rotated about pivot pin 215 until latch finger 218 clears the front face of latch block 220. Thereupon, the traveler block 85d comes to rest at the position it then occupies.

As shown in Figure 6, the gauging member 90d carried by traveler block 85d consists of a pair of bars 225, 226 which are attached to each other side by side, but which are longitudinally adjustable in position in respect to each other. To this end, parallel and registering longitudinal slots 227 and 228 are respectively formed in the bars 225, 226 in the portions thereof opposite traveler block 85d. The bars 225, 226 are then bolted to each other and to the traveler block by a pair of bolts 229 which pass through both of the slots 227, 228 to enter threaded holes (not shown) in the traveler block. By loosening and tightening the bolts 229 it is possible to give a self-parallel adjustment in position relative to traveler block 85d to either one of bars 225, 226 independently of the other bar.

The top surface of bar 225 consists of a lefthand section 235 of conducting material and a right-hand section 236 of insulating material. Similarly, the top surface of bar 226 consists of a left-hand section 237 of conducting material and a right-hand section 238 of insulating material. From the described manner in which these bars 225, 226 are adjustable in position, it will be seen that the bars can be so adjusted that there will be a lateral overlap of the insulating sections 236 and 238. This lateral overlap represents the insulating section 91d of Figure 1. It will, moreover, be seen that the length of this insulating section 91d, and the position of this insulating section relative to traveler block 85d can both be adjusted as desired through the described method of adjusting the positions of bars 225 and 226.

As further shown in Figure 6, the contactor 92d' for the gauging member 90d is comprised of a pair of contactor blades 240 and 241 which are mechanically separate but which are electrically connected with each other to act as a common contactor. The blade 240 rides on the bar 225, while the balde 241 rides on the bar 226. The two mentioned blades are carried by a pin 243 in such manner that each blade is independently free to rotate about the pin. Preferably, the blades 241 are each resiliently biased by spring means (not shown) so that each blade makes a good pressure contact with its corresponding bar as it travels thereover. The pin 243 is carried by an arm 244 which is in turn mounted by the traveler block 85d'. Thus, the contactor blades 240 and 241 are carried by this last-named traveler block to move therewith.

Figure 8:
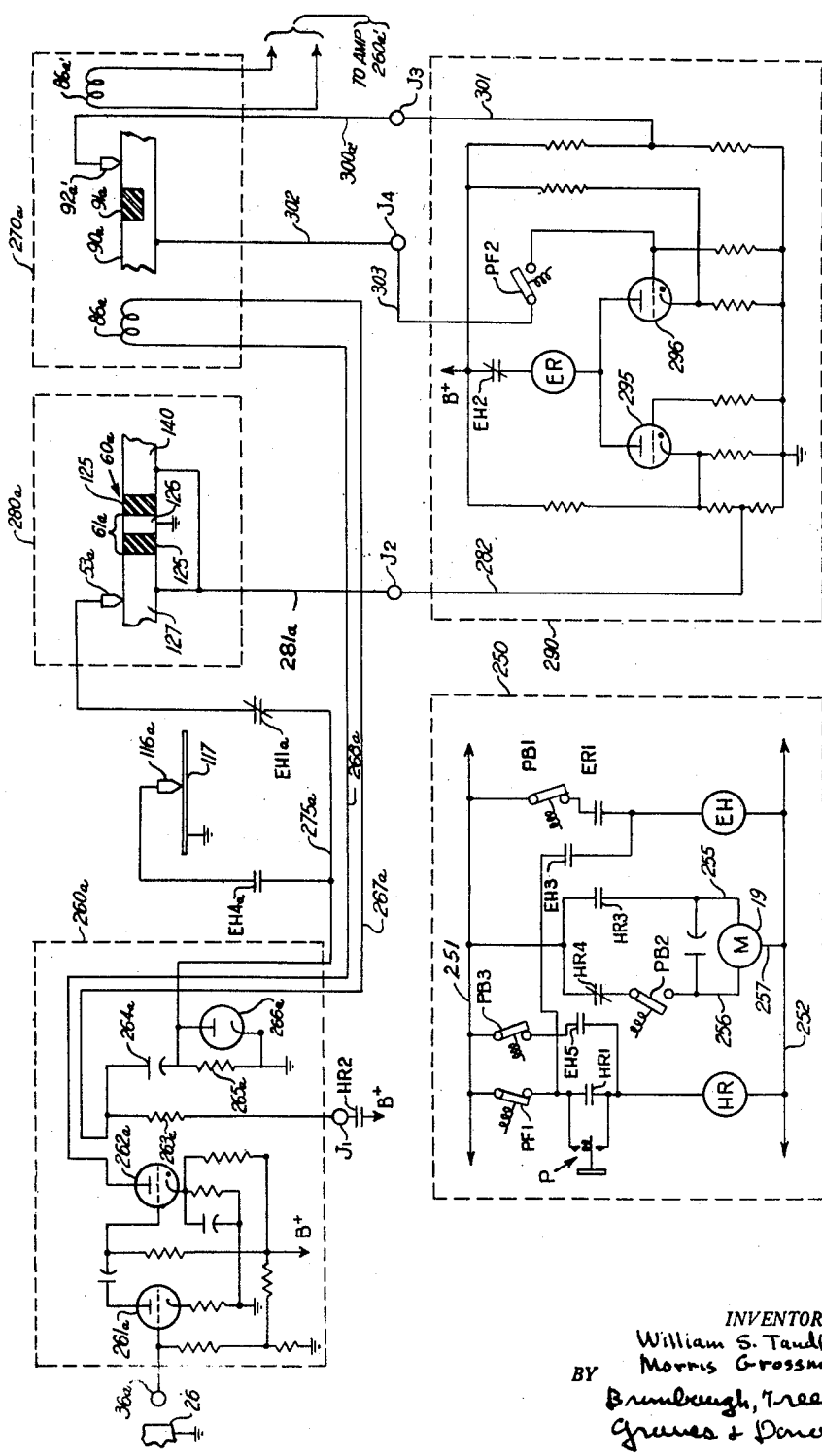
Figure 8 is a detailed schematic diagram of a portion of the electrical system of the apparatus.

In Figure 8, which represents in detailed schematic diagram a portion of the over-all electrical system for the described embodiment, the number 250 designates that portion of the system which will be referred to hereinafter as the A.C. control circuit. This circuit will be the first to be described, since it is only the operation of this circuit which is of particular significance in those instances where the gauged part 26 conforms in all respects to the preselected tolerance requirements therefor, and where, accordingly, the apparatus goes only through a gauging step rather than both a gauging and a recording step.

Some conventions used in the following description are that (a) any spring shown biasing a movable contact of a switch is a compression spring, (b) a relay contact shown as having a diagonal bar thereacross is a normally closed contact, and (c) a relay contact not showing such bar is a normally open contact. The relay contact and switch positions shown in Figure 8 are characteristic of the situation which exists when, before the initiation of an operating cycle, the carriage 30 is retracted to reference position so that the actuating lever 37 contacts the back limit microswitches PB1, PB2, PB3.

The operating cycle is initiated (Figure 8) by depresing a push button P in circuit 250 to energize a relay winding HR from A.C. bus lines 251, 252 through a current path as follows: line 251, closed forward limit switch PF1, push button P, winding HR, line 252.

Relay winding HR, when energized, produces the following contact operations. A pair of contacts HR1 are closed to provide a shunt path around push button P so that winding HR remains energized after the push button is released. A second pair of contacts HR2 (shown above the A.C. control circuit 250) are closed for a purpose later described. A third pair of contacts HR3 close to connect the right-hand non-common lead 255 of motor 19 to bus line 251. The motor 19 is a three-wire reversible capacitor motor having its common wire or lead 257 connected to bus line 252. As is characteristic of such motors, the motor 19 will rotate in one direction when energized through leads 255 and 257, and will rotate in the opposite direction when energized through lead 257 and the left-hand non-common lead 256. In the present instance, the motor 19 when energized through leads 255 and 257 rotates in the direction which advances the carriage 30 (Figure 1a) forwardly to bring probes 36a–36d into contact with part 26.

As motor 19 advances carriage 30 forwardly from reference position, the actuating lever 37 draws away from microswitches PB1, PB2, PB3 to release the same. As a result, the switches PB1 and PB3, previously held closed by lever 37, spring open, and the switch PB2, previously held open by lever 37, springs to closed position. These changes in switch position have no operational effect during the forward travel of carriage 30.

The carriage 30 moves forward to bring the probes 36a–36d in contact with part 26. Assume for the time being that the part 26 is within the tolerance requirements laid down therefor both as to individual tolerances and correlation tolerances. In this instance, the remainder of the cycle of operation takes place as follows. The carriage 30 continues to move forward until the lever 37 closes the normally open microswitch PF2 and opens the normally closed microswitch PF1. The closure of switch PF2 is not significant in the presently described cycle wherein the part 26 lies within all its tolerances.

The opening of switch PF1 interrupts the current path to winding HR to de-energize the same. In response, the contacts HR1 open to prevent re-energization of winding HR when switch PF1 again closes upon withdrawal of lever 37 from this switch during backward movement of carriage 30. At the same time, the contacts HR2 open for a later-described purpose, and the contacts HR3 open to end the energization of motor 19 through right-hand lead 255. Simultaneously, however, a pair of contacts HR4 will close to energize motor 19 through the normally closed micro-switch PB2 and through the left-hand non-common lead 256. The motor 19 will, accordingly, rotate in a direction to move carriage 30 backward towards its reference position.

The carriage 30 continues to move backwardly until the lever 37 strikes the back limit switches PB1 and PB2. The effect of engagement of lever 37 with the normally closed limit switch PB2 is to open this limit switch. When switch PB2 so opens, the motor 19 is wholly de-energized, and the carriage 30 remains in its reference position (with lever 37 holding switch PB2 open) until a new operation cycle is initiated by depressing the push button P.

Consider now what takes place in an operation cycle wherein gauging is followed by recording. In Figure 8 the number 260a designates the circuit which amplifies the signal produced upon contact of the probe 36a with part 26. As shown in Figure 8, the probe 36a is directly connected to the grid of a triode 261a, and this grid is ordinarily maintained at positive potential by a resistive connection thereof to a B+ voltage supply. When probe 36a contacts part 26, the grid of triode 261a is grounded to produce a positive pulse at the output of the triode tube. This positive pulse is applied to the grid of a thyratron 262a. Between the plate of the thyratron and the B+ supply there is connected (by leads 267a, 268a) the solenoid 86a (which is shown in Figure 8 to be in the thickness tolerance subassembly 270a), a current limiting resistor 263a, the junction J1, and the relay contact HR2. The junction of solenoid 86a and resistor 263a is connected to ground through the series connection of a charge storing capacitor 264a, and a voltage generating resistor 265a. If desired, a charging diode 266a may be connected in shunt with resistor 265a to conduct current from capacitor 264a towards ground.

The thyratron 262a is unsupplied with plate voltage until, at the start of the gauging cycle, the contacts HR2 close to permit current flow from B+ through resistor 263a, capacitor 264a, and charging diode 266a to ground. By this current, the capacitor 264a is charged to a steady state level of about B+ to supply this voltage at this level to the plate of the thyratron 262a in good time before probe 36a contacts the part 26. When contact is so made, the thyratron 262a is fired by the ensuing positive pulse at the grid thereof. This firing of the thyratron has two effects. First, the thyratron current energizes solenoid 86a in thickness unit 270a to unlatch the traveler block 85a (Figure 1b) from carriage 70 as earlier described. Second, the thyratron current discharges capacitor 264a through resistor 265a to cause a negative voltage pulse to be produced across the resistor.

The negative output pulse from amplifier 260a is supplied via lead 275a and the normally closed relay contacts EH1a to the contact stylus 53a (Figure 1b) which, with the bar 60a, forms an individual tolerance sub-assembly designated in Figure 8 as 280a. As shown in Figure 8, the portions of bar 60a represented by conducting strips 127 and 140 (Figure 4) are connected by a lead 281a to a junction J2 which is, in turn, connected by a lead 282 to an input of the D.C. control circuit 290. The other conducting strip 126 of bar 60a is shown in Figure 8 as connected to ground, this last-named strip being separated from the strips 127 and 140 by spaces occupied by insulating material belonging to the central insulating strip 125 of the bar 60a.

Consider now what happens when, at the time the negative pulse signal is applied to stylus 53a, the stylus rests on different ones of the several parts of bar 60a. If, at such time, the stylus rests on either strip 127 or strip 140, it is clear that the negative pulse signal will be transmitted via leads 281a and 282 to the D.C. control circuit 290. However, if at such time the stylus rests on strip 126, no signal will be transmitted to circuit 290, and the strip 126 establishes a shunt path to ground around resistor 265a (in amplifier 260a) so that the capacitor 264a is immediately discharged. If, when the signal is developed, the stylus is in the insulating space between strips 127 and 126, the capacitor 264a will not be immediately discharged, but will be discharged as soon as the stylus in its travel rides onto strip 126. On the other hand, if the signal is developed at the time the stylus is in the insulating space between strips 126 and 140, the capacitor 264a cannot discharge through this insulating zone, and hence can only discharge rather slowly through the resistor 265a. Hence, when the stylus subsequently rides onto the strip 140, the charge on capacitor 264a will still be sufficient in amount to produce a substantial negative signal flowing through the stylus, strip 140, and via the leads 281a, 282 to the D.C. control circuit 290.

From what has been said, it will be seen that the D.C. control circuit 290 does not receive any actuating signal in the instance where stylus 53a contacts either strip 126 or the insulating zone between this strip and strip 127 at the time that the probe contact signal is developed. The extent of strip 126 together with the extent between this strip and strip 127 accordingly represents the insulator section 61a which has been earlier described. As stated, an instantaneous position of a stylus in such insulator section at the time of the probe contact signal indicates that the part 26 is within the particular tolerance requirement defined by the particular insulator section, and no recording cycle will be caused to follow the gauging cycle. We shall assume, however, that the stylus 53a is without the insulator section 61a at the time of the probe contact signal. In this case a recording cycle is initiated in the following manner.

At the start of the gauging step, a pair of thyratrons 295, 296 in the D.C. control circuit 290 each has its plate connected to B+ through a relay winding ER and the normally closed relay contact EH2. The relay winding ER is initially unenergized inasmuch as both of thyratrons 295, 296 are initially unfired. In the assumed instance, however, the negative signal on lead 282 is applied to the cathode of tube 295 to fire this thyratron to thereby energize winding ER. The energization of this winding through a mechanical linkage 297 closes a pair of normally open contacts ER1 connected in series with the back limit switch PB1 and with a relay winding EH between bus lines 251, 252 in A.C. control circuit 250. The closing of contacts ER1 has no immediate effect inasmuch as at the time the switch PB1 is open. Accordingly, the effect of closure of contacts ER1 is delayed until the carriage 30 (Figure 1a) has, in the previously described manner, moved forward to trip the forward limit switches PF1, PF2 by the lever 37, and has then moved backward to trip the back limit switches PB1, PB2, PB3 by this same lever.

The lever 37 closes limit switch PB1 (Figure 8) to energize the relay winding EH. This energization has the following effects. First, a self-holding path is established for the winding EH by closure of a pair of contacts EH3 which connect the winding EH to the bus lines 251, 252 through the normally closed forward limit switch PF1. Second, the normally closed contacts EH2 in D.C. control circuit 290 are opened to de-energize the winding ER, and to thereby extinguish the fired condition of thyratron 295 and open the contacts ER1. Third, the normally closed contacts EH1a are opened to disconnect the sub-assembly 280a (for measuring individual tolerance) from the output of amplifier 260a. Fourth, a pair of normally open contacts EH4a close to connect the recording stylus 116a to the output of amplifier 260a. Fifth, the energization of winding EH closes a pair of contacts EH5 connected between winding HR and back limit switch PB3 to permit energization of this winding from lines 251, 252 through the path of PB3 and EH5 in series rather than through the usual path of switch PF1 in series, first, with push button P and, then, with contact HR1.

It will be recalled that before the contacts EH5 close (at the time lever 37 strikes the back limit switches to mark the end of the gauging step), the winding HR will have been de-energized (and the contact HR1 opened) by the opening of forward limit switch PF1 at the time carriage 30 reached its forward limit of travel. As earlier described, if the winding HR were to remain de-energized after carriage 30 reaches its backward travel limit at the end of the gauging step, the operational cycle for the described embodiment would end then and there. In the present instance, however the closure of contacts EH5 indicates that the embodiment must, in addition, go through a recording step, and this recording step is initiated by having winding HR re-energized through contacts EH5 and through the switch PB3 which will be closed when carriage 30 is at its back travel limit.

When winding HR is re-energized, the carriage 30 is first advanced to its former limit and then returned to its back limit by successive operations of the A.C. control circuit 250 which are substantially the same as those earlier described operations which control the carriage movement during the gauging step. The one additional event which occurs in the recording step is that the opening of forward limit switch PF1 opens the current path through contacts EH3 which served to energize relay winding EH after the opening up of the path through ER1 and PB1 which originally supplied current to this winding. Thus, when carriage 30 reaches its forward travel limit during the recording step, the winding EH is de-energized to thereby reset all of the "EH" contacts associated with this winding to the respective conditions which they had before the said winding was energized. Accordingly, at the end of the recording step the system will be fully reset to undergo another gauging step when the push button P is again depressed.

As earlier stated, the described system will go through a recording step if either the individual tolerance unit 17 (Figure 1b) indicates that part 26 violates an individual tolerance, or the correlation tolerance unit 18 indicates that part 26 violates a correlation tolerance. For an understanding of how the correlation tolerance unit 18 may induce a recording step, reference is made in Figure 8 to the thicknesss tolerance sub-assembly 270 which includes the solenoids 86a and 86a', the contactor 92a' and the gauging member 90a with its insulator section 91a. It will be recalled that before carriage 30 reaches its forward travel limit, both of the solenoids 86a and 86a' will have been energized to bring the contactor 92a' and the gauging member 90a into a condition of relative rest. The contactor 92a' is connected through a lead 300a', a junction J3, and a lead 301 to a positive voltage point within the D.C. control circuit 290. The gauging member 90a is connected through a lead 302a, the junction J4 and the lead 303 to the movable contact of the normally open forward limit switch PF2. The fixed contact of this switch is connected to the grid of thyratron 296.

When carriage 30 reaches its forward travel limit, the lever 37 closes switch PF2. If, at the time switch PF2 closes, the contact 92a' is resting on insulator section 91a (to indicate that part 26 is within the correlation tolerance defined by sub-assembly 270a), no signal is transmitted through switch PF2 to the grid of thyratron 296, and the thyratron accordingly remains unfired. Thus, if thyratron 295 is also unfired at this time (because individual tolerance unit 17 has indicated that part 26 conforms for every tolerance measured by this unit), the relay winding ER remains unenergized, and the operational cycle for the described system ends at the end of the gauging step. If, on the other hand, the contactor 92a' is resting on the conducting portion of gauging member 90a at the time switch PF2 is closed (to thereby indicate that part 26 violates the correlation tolerance defined by sub-assembly 270a'), a positive voltage signal will be conducted via lead 301, junction J3, lead 300a', contactor 92a', member 90a, lead 302a, junction J4, lead 303, and switch PF2 to the grid of thyratron 296 to fire this thyratron. In this latter instance the winding ER is energized to initiate a recording step for the described embodiment, and this recording step will take place whether or not one or more indications from the individual tolerance unit 17 also call for a recording step.

Figure 9:
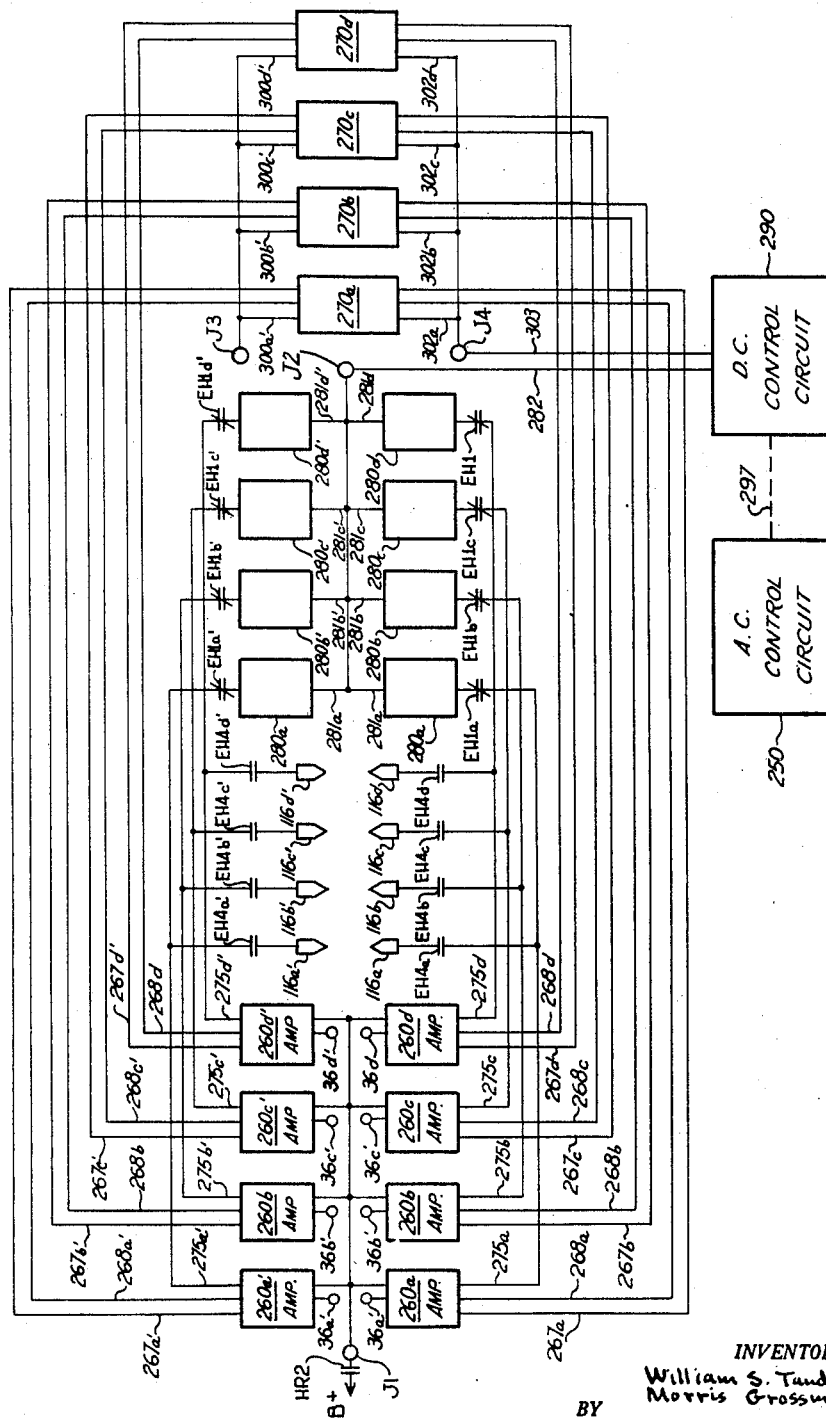
Figure 9 is a block diagram of the entire electrical system.

Figure 9 represents an over-all schematic diagram for the electrical system utilized with the described embodiment. As shown in Figure 9, each of the probes 36a–36d and 36a'–36d' has its own amplifier to amplify the signal produced upon contact of the probe with the part 26. Each of these amplifiers supplies its output signal during the gauging step to a corresponding individual tolerance sub-assembly, and during the recording step, if any, to a corresponding recording stylus. Moreover, the two amplifiers associated with each oppositely disposed pair of probes are connected to both supply signals to a common thickness tolerance sub-assembly. For example, the amplifiers 260a and 260a' both supply signals to the solenoids 86a' (Figure 8) of the sub-assembly 270a.

As shown in Figure 9, all of the amplifiers 260a–260d and 260a'–260d' are ganged together through the junction J1 so that the relay contacts HR2 control every amplifier simultaneously in respect to the connection of B+ voltage to the thyratrons and charge storing capacitor circuits thereof. In this connection, it will be noted that the opening of contacts HR2 at the end of the gauging step will de-energize all of the solenoids 86a–86d and 86a'–86d' (Figure 1b) to thereby permit the carriages 70 and 70' to re-latch with the traveler blocks 85a–85d and 85a'–85d' during the gauging step of the next operation cycle.

Moreover, the individual tolerance sub-assemblies 280a–280d and 280a'–280d' are all ganged together through the junction J2 so that a signal produced by any one of these sub-assemblies (to indicate that part 26 is out of tolerance for that assembly) will operate the D.C. control circuit 290 in the manner hitherto described. Similarly, all of the thickness tolerance sub-assemblies 270a–270d are ganged together through junctions J3 and J4 so that any one of these sub-assemblies can operate the D.C. control circuit.

The above-described embodiment being exemplary only, it will be understood that the invention herein contemplates embodiments differing in form or detail from the above-described embodiment. For example, while any one of the probes has been described above as starting its movement towards the part to be gauged from a position referenced to the datum point R, it is not necessary that the probes start at such predetermined position providing that (1) the probe passes through such position on the way to the part, (2) the instantaneous presence of the probe in such position is detected by suitable means as described in the aforementioned patent, and (3) the corresponding individual tolerance subassembly and the corresponding correlation tolerance subassembly are both rendered operable as a function of the movement of this probe at the time when the probe passes through this predetermined position. In correlation tolerance measuring, it is not even necessary for a pair of probes making such measurement to pass through respective positions which are referenced to point R so long as the probes start at or pass through respective positions which have a predetermined space relation to each other.

Other correlation tolerance measurements besides thickness may be made. For example, by rendering the solenoid 86a (Fig. 1b) operable to release the traveler block 85a from carriage 70 in response to contact of probe 36d with part 26 (rather than in response to contact of probe 36a with part 26), it is possible to obtain the value of the distance component, in the direction of the probe movement, of the slant line connecting the portions of part 26 respectively contacted by probes 36a' and 36d. Since the component of this slant line transverse to the probe movement direction remains substantially constant, the obtained value of the first-mentioned component of the slant line provides a measure of the "twist" of part 26.

Further, it is not necessary, in order to make correlation measurements by a pair of probes, for the pair of probes to approach part 26 from opposite directions. Thus, for example, the chord line 44 (Fig. 2) is a convenient representation of the twist of part 26, and the component of chord line 44 in the direction of probe movement provides a convenient measure of such twist. The value of this component may be determined by rearranging the latch arm 87a (Fig. 1b) of solenoid 86a to latch with the back rather than with the front of traveler block 85a, by rendering solenoid 86a operable to lift latch arm 87a in response to contact of probe 36d' with part 26, and by reversing the direction of movement imparted to rack bar 73 from gear 74 as, say, by interposing an idler gear between the gear 74 and the rack bar. Under these circumstances, the relative displacement of stylus 92a over gauging member 90a will be a function of the difference between the respective distances to contact traveled by probes 36a' and 36d'. In this view, the relative travel of stylus 92a over member 90a from a predetermined starting point thereon will be a measure of the component of chord line 44 which lies in the direction of probe movement. The insulating section 91a may be properly located relative to this predetermined starting point, to obtain a "yes-no" indication of whether the twist of part 26 satisfies both minimum and maximum tolerance limits which have been preselected for this twist.

Accordingly, the invention herein is not to be considered as limited save as is consonant with the scope of the following claims.

We claim:

1. Apparatus comprising, holder means to mount a mechanical part to be gauged, probe means adapted by moving into contact with said part to indicate a tolerance condition thereof in terms of distance to contact traveled by said probe means, drive means adapted when actuated to initially move said probe means to make said contact and to withdraw said probe means from said contact, tolerance indicating means operable in accordance with said movement into contact of said probe means to translate said distance indication into a "yes-no" indication of whether said tolerance condition satisfies at least one preselected tolerance requirement therefor, control means responsive only to a "no" indication of said indicating means to reactuate said drive means to move said probe means into contact with said part, and recording means operable in accordance with movement towards contact of said probe means during said reactuation to translate distance to contact then traveled by said probe means into a record of a tolerance condition of said part.

2. Apparatus in which relations of positions therein are determinable by referring said positions to a common datum provided by at least one point having a predetermined position in space, said apparatus comprising, holder means to mount a mechanical part to be gauged, at least one probe adapted by moving into contact with a portion of said part to indicate an individual tolerance condition, referenced to said datum, of said portion in terms of distance to contact traveled by said probe, drive means adapted when actuated to initially move said probe to make said contact and to withdraw said probe from said contact, tolerance indicating means operable in accordance with said movement into contact of said probe to translate said distance indication into a "yes-no" indication of whether said individual tolerance condition of said portion satisfies at least one preselected tolerance requirement therefor, control means responsive only to a "no" indication of said indicating means to reactuate said drive means to move said probe into contact with said portion, and recording means operable in accordance with movement towards contact of said probe during said reactuation to translate distance to contact then traveled by said probe into a record of said individual tolerance condition of said portion.

3. Apparatus comprising, holder means to mount a mechanical part to be gauged, at least two probes adapted by each moving into contact with said part to conjointly indicate a correlation tolerance condition thereof in terms of a combined distance which is a resultant of respective distances to contact traveled by said two probes, drive means adapted when actuated to initially move both said probes to make said contact and to then withdraw from said contact, tolerance indicating means operable in accordance with said movements into contact of both said probes to translate said combined distance indication into a "yes-no" indication of whether said correlation tolerance condition satisfies at least one preselected tolerance requirement therefor, control means responsive only to a "no" indication of said indicating means to reactuate said drive means to move at least one probe into contact with said part, and recording means operable in accordance with movement towards contact of said one probe during said reactuation to translate distance to contact then traveled by said one probe into a record of a tolerance condition of said part.

4. Apparatus comprising; holder means to mount a mechanical part to be gauged; a plurality of probe means each adapted by moving into contact with said part to indicate a tolerance condition thereof in terms of distance to contact traveled by the particular probe means; drive means adapted when actuated to initially move said plurality of probe means to each make said contact and then withdraw from said contact, a plurality of tolerance indicating means each operable in accordance with said movement into contact of a corresponding probe means to translate the distance indication thereof into a "yes-no" indication of whether the tolerance condition represented by the distance indication of the probe means satisfies at least one preselected tolerance requirement therefor; control means responsive only to a "no" indication of any one of said tolerance indicating means to reactuate said drive means to move at least one probe means into contact with said part, and recording means operable in accordance with movement towards contact of said one probe means during said reactuation to translate distance to contact then traveled by said one probe means into a record of a tolerance condition of said part.

5. Apparatus in which relations of positions therein are determinable by referring said positions to a common datum provided by at least one point having a predetermined position in space, said apparatus comprising; holder means to mount a mechanical part to be gauged; a plurality of probes of which at least one probe is adapted by moving into contact with one portion of said part to indicate an individual tolerance condition, referenced to said datum, for said one portion in terms of distance traveled to contact by said one probe, and of which at least two probes are adapted by moving into respective contacts with two separate portions of said part to conjointly indicate a correlation tolerance condition for said two portions in terms of a combined distance which is a resultant of respective distances to contact traveled by said two probes; drive means adapted when actuated to initially move said probes to each make contact with said part and to then withdraw from said contact; first tolerance indicating means operable in accordance with said movement into contact of said one probe to translate the distance indication thereof into a "yes-no" indication of whether said individual tolerance condition satisfies at least one preselected tolerance requirement therefor; second tolerance indicating means operable in accordance with initial movements towards contact of said two probes to translate said combined distance indication into a "yes-no" indication of whether said correlation tolerance condition satisfies at least one preselected tolerance requirement therefor; control means responsive only to a "no" indication of either one of said first and second indicating means to reactuate said drive means to move a probe into contact with said part; and recording means operable in accordance with movement towards contact of said last-named probe during said reactuation to translate distance to contact then traveled by said last-named probe into a record of a tolerance condition of said part.

6. Apparatus in which relations of positions therein are determinable by referring said positions to a common datum provided by at least one point having a predetermined position in space, said apparatus comprising; holder means to mount a mechanical part to be gauged; a plurality of probes of which at least two probes are adapted by respectively moving into contact with two separate portions of said part to conjointly indicate a correlation tolerance condition for said two portions in terms of a combined distance which is a resultant of respective distances to contact traveled by said two probes; drive means adapted when actuated to initially move said two probes to each make contact with said part and to then withdraw from said contact; tolerance indicating means operable in accordance with said movements into contact of said two probes to translate the combined distance indication thereof into a "yes-no" indication of whether said correlation tolerance condition satisfies at least one preselected tolerance requirement therefor; control means responsive to a "no" indication of said indicating means to reactuate said drive means to move ones of said plurality of probes into contact with respective portions of said part; and recording means operable in accordance with movements towards contact of said last-named probes during said reactuation to translate the respective distances to contact then traveled by said last-named probes into a record of individual tolerance conditions, referenced to said datum, of said respective portions.

7. Apparatus in which relations of positions therein are determinable by referring said positions to a common datum provided by at least one point having a predetermined position in space, said apparatus comprising; holder means to mount a mechanical part to be gauged; a plurality of probes of which at least two probes are adapted by moving into contact with two separate portions of said part to conjointly indicate a correlation tolerance condition for said two portions in terms of a combined distance which is a resultant of respective distances to contact traveled by said two probes; drive means adapted when actuated to initially move said two probes to each make contact with said part and to then withdraw from said contact; tolerance indicating means operable in accordance with said movements into contact of said two probes to translate the combined distance indication thereof into a "yes-no" indication of whether said correlation tolerance condition satisfies at least one preselected tolerance requirement therefor; and control means responsive only to a "no" indication of said indicating means to reactuate said drive means to move ones of said probes into contact with respective portions of said part, said last-named probes being adapted by moving into contact with said respective portions during said reactuation to indicate individual tolerance conditions, referenced to said datum, of said respective portions in terms of respective distances to contact traveled by said last-named probes during said reactuation.

8. Apparatus in which relations of positions therein are determinable by referring said positions to a common datum provided by at least one point having a predetermined position in space, said apparatus comprising; holder means to mount a mechanical part to be gauged;

probe means adapted by moving into contact with said part to indicate a tolerance condition thereof in terms of distance to contact traveled by said probe means; drive means adapted when actuated to initially move said probe means to make said contact and to withdraw said probe means from said contact, tolerance indicating means operable in accordance with said movement into contact of said probe means to translate said distance indication into a "yes-no" indication of whether said tolerance condition satisfies at least one preselected tolerance requirement therefor; and control means responsive only to a "no" indication of said indicating means to reactuate said drive means to move said probe means into contact with said part to indicate an individual tolerance condition, referenced to said datum, of said part in terms of distance to contact traveled by said probe means during said reactuation.

9. Apparatus in which relations of positions therein are determinable by referring said positions to a common datum provided by at least one point having a predetermined position in space, said apparatus comprising; holder means to mount a mechanical part to be gauged; a plurality of probes of which at least one probe is adapted by moving into contact with one portion of said part to indicate an individual tolerance condition, referenced to datum, for said one portion in terms of distance traveled to contact by said one probe, and of which at least two probes are adapted by moving into respective contacts with two separate portions of said part to conjointly indicate a correlation tolerance condition for said two portions in terms of a combined distance which is a resultant of respective distances to contact traveled by said two probes; drive means adapted when actuated to initially move said probes to each make contact with said part and to then withdraw from said contact; first tolerance indicating means operable in accordance with said movement into contact of said one probe to translate the distance indication thereof into a "yes-no" indication of whether said individual tolerance condition satisfies at least one preselected tolerance requirement therefor; and second tolerance indicating means operable in accordance with initial movements towards contact of said two probes to translate said combined distance indication into a "yes-no" indication of whether said correlation tolerance condition satisfies at least one preselected tolerance requirement therefor.

10. Apparatus in which relations of positions therein are determinable by referring said positions to a common datum provided by at least one point having a predetermined position in space; said apparatus comprising; holder means to mount a mechanical part to be gauged; first and second probes of which said first probe is adapted by moving into contact with a first portion of said part to indicate an individual tolerance condition, referenced to said datum, of said portion in terms of distance to contact traveled by said first probe, and of which said two probes are adapted by respectively moving into contact with said first and a second portion of said part to conjointly indicate a correlation tolerance condition for said two portions in terms of a combined distance which is the resultant of respective distances to contact traveled by said two probes; drive means to move said probes to each make said contact; first tolerance indicating means operable in accordance with said movement into contact of said first probe to translate the distance indication thereof into a "yes-no" indication of whether said tolerance condition satisfies at least one preselected tolerance requirement therefor; and second tolerance indicating means operable in accordance with respective movements toward contact of said two probes to translate said combined distance indication into a "yes-no" indication of whether said correlation tolerance condition satisfies at least one preselected tolerance requirement therefor.

11. Apparatus as in claim 10 in which said second probe is adapted by moving into contact with said second portion to indicate an individual tolerance condition, referenced to said datum, of said second portion in terms of distance to contact traveled by said second probe, said apparatus further comprising additional tolerance indicating means operable in accordance with movement towards contact of said second probe to translate said distance indication thereof into a "yes-no" indication of whether said individual tolerance condition of said second portion satisfies at least one preselected tolerance requirement therefor.

12. Apparatus as in claim 10 in which said first and second probes are disposed on opposite sides of said part, and are adapted to move into contact with said part by moving towards each other in the same straight line path of movement.

13. Apparatus comprising; holder means to mount a mechanical part to be gauged; first and second probes adapted by respectively moving into contact with said part from respective probe positions, in predetermined space relation to each other, to indicate a correlation tolerance condition of said part in terms of a combined distance which is a resultant of respective distances to contact traveled by said probes from said probe positions; a member; stylus means having electrical contactor tip means adapted to contact a surface of said member; drive means adapted to move said two probes to each make contact and then withdraw from said contact, and further adapted by relatively moving said member and stylus to produce relative displacement between said tip means and surface which starts from a predetermined position of said tip means on said surface, and which accords with the combined distance indication of said two probes; first and second electrical contact sections characterizing said surface along the direction of said displacement and having at least one place of demarcation between sections which is displaced from said predetermined position of said tip means in an amount representing, in terms of said displacement, a resultant of the value of the distance between said probe positions and the value of a tolerance limit for said correlation tolerance condition; and electric circuit means including said stylus means and said member, said circuit means being selectively responsive to contact at the end of said displacement of said tip means with, respectively, said first and said second sections to provide a "yes-no" electric signal indication of whether said correlation tolerance condition satisfies said tolerance limit therefor.

14. Apparatus as in claim 13 in which said combined distance is a resultant of the sum of respective distances to contact traveled by said two probes, and in which the amount of displacement of said place of demarcation from said predetermined position of said tip means represents, in terms of said relative displacement, the difference of the value of the distance between said probe positions and the value of said tolerance limit.

15. Apparatus comprising; holder means to mount a mechanical part to be gauged; first and second probes adapted by moving into contact with separate portions of said part from respective probe positions, in predetermined space relation to each other, to indicate a correlation tolerance condition of said two portions in terms of a combined distance which is a resultant of the distance traveled to contact by said first probe from its probe position and the distance traveled to contact by said second probe from its probe position; a member; stylus means having electrical contactor tip means adapted to contact a surface of said member; drive means to move said first and second probes from said probe positions to respectively bring said probes into contact with said portions, first motive means adapted by relatively moving said member and stylus means to produce relative displacement of said tip means and surface, from a predetermined position of said tip means on said surface, in accordance with said distance traveled to contact by said first probe, second motive means adapted by relatively moving said member and stylus means to produce a superposed relative displacement of said tip means and surface in accordance with said distance to contact traveled by said second probe, said two relative displacements producing a combined relative displacement of said tip means and surface which represents said combined distance; first and second electrical contact sections characterizing said surface along the direction of said displacements and having a place of demarcation between sections displaced from said predetermined position of said tip means in an amount representing, in terms of said combined relative displacement, the resultant of the value of the distance between said probe positions and the value of a tolerance limit for said correlation tolerance condition; and electric circuit means including said member and stylus, said circuit being selectively responsive to contact at the end of said combined displacement of said tip with, respectively, said first and said second sections to provide a "yes-no" electric signal indication of whether said tolerance condition satisfies said tolerance limit.

16. Apparatus comprising; holder means to mount a mechanical part to be gauged; first and second probes adapted by moving into contact with separate portions of said part from respective probe positions, in predetermined space relation, to indicate a correlation tolerance condition for said two portions in terms of a combined distance which is a resultant of the distance traveled to contact of said first probe from its probe position and the distance traveled to contact by said second probe from its probe position; carriage means mounting said probes to move both said probes from their respective probe positions into their respective contacts with said portions, and to permit said probes to yield backwardly on said carriage means upon making contact; a member; stylus means having electrical contactor tip means adapted to contact a surface of said member; drive means to move said carriage means towards said holder means in an amount more than sufficient to bring both said probes into contact with said parts; first motive means selectively coupleable mechanically with said member and adapted while coupled thereto to relatively move said member and stylus means to produce a first relative displacement of said tip means and surface from a predetermined position of said tip means on said surface in accordance with the said distance to contact traveled by said first probe, second motive means selectively coupleable mechanically to said stylus means and adapted while coupled thereto to produce a second superposed relative displacement of said tip means and surface in accordance with the said distance to contact traveled by said second probe, said two relative displacements producing a combined relative displacement of said tip and surface which represents said combined distance, first electromechanical means electrically responsive to contact of said first probe with said part to uncouple said first motive means from said member to terminate said first displacement, second electromechanical means responsive to contact of said second probe with said part to uncouple said second motive means from said stylus means to terminate said second displacement; first and second electrical contact sections characterizing said surface along the direction of said displacements and having a place of demarcation between sections which is displaced from said predetermined position of said tip means in an amount representing, in terms of said combined relative displacement, the resultant of the value of the distance between said probe positions and the value of a tolerance limit for said correlation tolerance condition; an electric circuit means including said member and stylus, said circuit being selectively responsive to contact of said tip with, respectively, said first section and said second section at the end of said combined displacement to provide a "yes-no" electric signal indication of whether said tolerance condition satisfies said tolerance limit.

17. Apparatus as in claim 16 in which relations of positions therein are determinable by referring said positions to a common datum provided by at least one point having a predetermined position in space, and in which said holder means mounts said part in referenced position to said datum, and said two probe positions are each referenced to said datum.

18. Apparatus to indicate a tolerance condition of a mechanical part which is gauged by moving probe means into contact with said part, said apparatus comprising; a composite member formed of a first piece and a second piece which are longitudinally parallel and laterally offset, said pieces having respective lengthwise conducting surfaces conjointly to provide a surface of said member with a first electrical conducting section and with a second electrical conducting section disposed in longitudinally parallel and laterally offset relation and, also, in longitudinally offset relation to provide a longitudinal gap between said sections, the said sections and the said gap defining two places of demarcation respectively representing a maximum and minimum tolerance for said tolerance condition, means rendering said two pieces relatively adjustable in the length of said member to permit individual positional adjustments of both said places of demarcation in said length, stylus means having electrical contactor tip means adapted to move lengthwise on and over said sections of said surface and shaped to have a lateral width straddling the lateral width intervals of said member occupied by said two conducting sections, a body of insulating material forming a component of said member and disposed to prevent flow of current between said tip means and one of said sections when said tip means is in contact with the other of said sections, motive means adapted by relatively moving said stylus means and member to produce relative displacement of said tip means over said sections in accordance with distance traveled by said probe means to contact said part, and electric circuit means operable by applying a voltage across said stylus means and member in series, after said probe means has contacted said part, to provide a selective electric signal in response to said voltage in accordance with whether said tip means is within or without said two places of demarcation at the time said voltage is applied, said selective signal providing a "yes-no" indication of whether said tolerance condition satisfies both of said tolerance limits.

19. Apparatus as in claim 18 in which said electric circuit includes said part and said probe means as switch elements which, upon making contact, develop said voltage applied across said stylus means and member.

20. Apparatus as in claim 18 further comprising support means formed to interlock with said member to permit replaceable mounting thereof on said support means.

21. Apparatus as in claim 18 further comprising support means adapted to mount a plurality of said composite members.

22. Apparatus adapted to indicate a correlation tolerance condition between separate portions of a mechanical part which are gauged by moving first and second probes into respective contacts therewith, said apparatus comprising; a member having a surface divided lengthwise into first and second sections demarcated from each other at at least one place representing a tolerance limit for said correlation tolerance condition, means mounting said member to permit lengthwise movement thereof from a predetermined starting point relative to said mounting means; stylus means having electrical contactor tip means adapted to move lengthwise on and over said sections; means mounting said stylus means to permit movement thereof in the lengthwise direction of said member from a predetermined starting point relative to said last-named mounting means; a body of insulating material forming a component of said member to prevent flow of current between said tip means and one of said sections when said tip means is in contact with the other of said sections; first motive means selectively coupleable mechanically to said member and adapted when coupled htereto to displace said member from its starting position in accordance with distance traveled to contact by said first probe, second motive means selectively coupleable mechanically to said stylus means and adapted when coupled thereto to displace said stylus means from its starting position in accordance with distance traveled to contact by said second probe; first electromechanical means electrically responsive to contact of said first probe and said part to uncouple said first motive means from said member to thereby bring said member to rest, second electromechanical means electrically responsive to contact of said second probe and said part to uncouple said second motive means from said stylus means to thereby bring said stylus means to rest, and electric circuit means operable by applying a voltage across said stylus means and member after both have come to rest to provide a selective electric signal in response to said voltage and in accordance with which of said sections is contacted by said tip means at the time said voltage is applied, said selective signal providing a "yes-no" indication of whether said tolerance condition satisfies said limit.

23. Apparatus comprising, holder means to mount a mechanical part to be gauged, probe means adapted by relatively moving into contact with said part to indicate a tolerance condition for said part in terms of relative distance to contact traveled by said probe means, a member, stylus means having electrical contactor tip means adapted to contact a surface of said member, drive means adapted to move said probe means into contact with said part, and further adapted by relatively moving said member and stylus means to produce relative displacement between said tip means and surface which accords with said relative distance to contact traveled by said probe means, a first electrical conducting section, a first insulating section, a second electrical conducting section, a second insulating section, and a third electrical conducting section characterizing said surface in the order named along the direction of said displacement, the said first and second conducting sections at the far ends thereof in said direction having respective margins which respectively represent a maximum and a minimum tolerance limit for said tolerance condition, electric circuit means including said probe means and said member, said circuit means being selectively responsive to contact of said probe means with said part to produce an electric signal whose leading edge indicates the occurrence of such contact, means to transmit said signal to said tip means, indicating means coupled with said tip means and said first and third conducting sections and normally adapted to be actuated by said signal to produce an indication that said part violates one of said limits in instances where the leading edge of said signal is produced while said tip means contacts either one of said last named sections, means adapted, after said probe means has contacted said part, to create an overrun of said tip means in said direction and in an amount whereby said tip means reaches said third section in instances where the leading edge of said signal is produced while said tip means is on said second insulating section, said signal having a duration sufficient to actuate said indicating means in said last named instances, and an electrical coupling including said tip means and second conducting section to disable said indicating means from producing said indication in instances where the leading edge of said signal is produced while said tip means lies between the said margins of said first and second conducting sections.

References Cited in the file of this patent

UNITED STATES PATENTS

| | | |
|---|---|---|
| 900,529 | Hansen | Oct. 6, 1908 |
| 1,286,156 | Vallaro | Nov. 26, 1918 |
| 1,688,330 | Gunther | Oct. 23, 1928 |
| 2,281,888 | Snyder | May 5, 1942 |
| 2,302,626 | Gallagher | Nov. 17, 1942 |
| 2,554,171 | Brunot | May 22, 1951 |
| 2,592,157 | Kendall | Apr. 8, 1952 |
| 2,637,842 | Smith | May 5, 1953 |
| 2,697,879 | Tandler | Dec. 28, 1954 |